US005999807A

United States Patent [19]

Kaplan et al.

[11] Patent Number: 5,999,807
[45] Date of Patent: Dec. 7, 1999

[54] SYSTEM AND METHOD FOR THE VERIFICATION OF AUTHENTIC TELEPHONE NUMBERS IN A WIRELESS TELEPHONE SYSTEM

[75] Inventors: Dmitry Kaplan, Bellevue; David M. Stanhope, Tacoma, both of Wash.; Randolph W. McKernan, Graton, Calif.; Howard L. Wilburn, Bainbridge Island; Evan R. Green, Bothell, both of Wash.

[73] Assignee: Cellular Technical Services Company, Inc., Seattle, Wash.

[21] Appl. No.: 08/810,493

[22] Filed: Feb. 28, 1997

[51] Int. Cl.⁶ ............................................. H04M 1/66
[52] U.S. Cl. .................................. 455/411; 379/189
[58] Field of Search .............................. 455/67.1, 410, 455/411, 517, 524, 456; 379/45, 189

[56] References Cited

U.S. PATENT DOCUMENTS

| | | | |
|---|---|---|---|
| 4,800,387 | 1/1989 | Joy | 342/165 |
| 4,843,562 | 6/1989 | Kenyon et al. | 364/487 |
| 4,955,049 | 9/1990 | Ghisler | 379/58 |
| 5,005,210 | 4/1991 | Ferrell | 455/115 |
| 5,091,942 | 2/1992 | Dent | 380/46 |
| 5,222,140 | 6/1993 | Beller et al. | 380/30 |
| 5,237,612 | 8/1993 | Raith | 380/23 |
| 5,239,294 | 8/1993 | Flanders et al. | 340/825.34 |
| 5,241,598 | 8/1993 | Raith | 380/21 |
| 5,282,250 | 1/1994 | Dent et al. | 380/23 |
| 5,299,263 | 3/1994 | Beller et al. | 380/30 |
| 5,303,285 | 4/1994 | Kerihuel et al. | 379/58 |
| 5,309,501 | 5/1994 | Kozik et al. | 379/58 |
| 5,315,636 | 5/1994 | Patel | 379/58 |
| 5,319,699 | 6/1994 | Kerihuel et al. | 379/58 |
| 5,329,591 | 7/1994 | Magrill | 380/25 |
| 5,335,265 | 8/1994 | Cooper et al. | 379/59 |
| 5,335,278 | 8/1994 | Matchett et al. | 380/23 |
| 5,345,595 | 9/1994 | Johnson et al. | 455/33.1 |
| 5,375,244 | 12/1994 | McNair | 395/725 |
| 5,390,245 | 2/1995 | Dent et al. | 380/23 |
| 5,392,355 | 2/1995 | Khurana et al. | 380/23 |
| 5,392,356 | 2/1995 | Konno et al. | 380/23 |
| 5,420,908 | 5/1995 | Hodges et al. | 379/58 |
| 5,420,910 | 5/1995 | Rudokas et al. | 379/59 |
| 5,448,760 | 9/1995 | Frederick | 455/56.1 |
| 5,455,863 | 10/1995 | Brown et al. | 380/23 |
| 5,465,387 | 11/1995 | Mukherjee | 455/26.1 |
| 5,467,382 | 11/1995 | Schorman | 379/58 |
| 5,488,649 | 1/1996 | Schellinger | 379/62 |
| 5,509,075 | 4/1996 | Grube et al. | 380/23 |
| 5,517,554 | 5/1996 | Mitchell et al. | 379/59 |
| 5,517,555 | 5/1996 | Amadon et al. | 379/59 |
| 5,517,568 | 5/1996 | Grube et al. | 380/23 |

(List continued on next page.)

*Primary Examiner*—Reinhard J. Eisenzopf
*Assistant Examiner*—Sam Bhattacharya
*Attorney, Agent, or Firm*—Seed and Berry LLP

[57] ABSTRACT

A system for the authorization of wireless telephone communications establishes two sets of authorized telephone numbers. A first set of authorized telephone numbers are supplied by the customer, and the second set of authorized numbers are derived from customer bills paid by the customer. The system analyzes transmission characteristics from an unauthenticated cellular telephone and attempts to verify its authenticity based on the transmission characteristic by analyzing the transmission characteristic with respect to stored reference waveforms for the authentic wireless telephone. However, the results of this signature analysis if negative may be overridden if the telephone number dialed by the unauthenticated cellular telephone matches a telephone number in either the first or second sets of authorized telephone numbers. The system also includes a technique for modifying the reference waveforms to compensate for changes in the transmission characteristic. The system will only consider the inclusion of transmission characteristics from the present communication if the dialed digits for the present communication match one of the telephone numbers in either the first or second sets of authorized telephone numbers.

20 Claims, 14 Drawing Sheets

U.S. PATENT DOCUMENTS

| | | | |
|---|---|---|---|
| 5,535,431 | 7/1996 | Grube et al. | 455/54.1 |
| 5,537,474 | 7/1996 | Brown et al. | 380/23 |
| 5,541,977 | 7/1996 | Hidges et al. | 379/58 |
| 5,548,636 | 8/1996 | Bannister et al. | 379/201 |
| 5,551,073 | 8/1996 | Sammarco | 455/89 |
| 5,555,192 | 9/1996 | Grube et al. | 364/514 R |
| 5,555,551 | 9/1996 | Rudokas et al. | 379/59 |
| 5,557,654 | 9/1996 | Mäenpää | 379/58 |
| 5,615,408 | 3/1997 | Johnson et al. | 455/33.1 |
| 5,625,869 | 4/1997 | Nagamatsu et al. | 455/33.1 |
| 5,633,914 | 5/1997 | Rosa | 379/59 |
| 5,655,004 | 8/1997 | Holbrook | 455/411 |
| 5,713,072 | 1/1998 | Marth et al. | 455/33.1 |
| 5,715,518 | 2/1998 | Barrere et al. | 455/49.1 |
| 5,748,722 | 5/1998 | Lee | 379/160 |
| 5,748,742 | 5/1998 | Tisdale et al. | 380/49 |
| 5,758,277 | 5/1998 | Hawkes | 455/410 |
| 5,770,846 | 6/1998 | Mos et al. | 1235/440 |
| 5,777,558 | 7/1998 | Pennypacker et al. | 455/410 |
| 5,790,645 | 8/1998 | Fawcett et al. | 379/189 |
| 5,805,674 | 9/1998 | Anderson, Jr. | 379/93.03 |

SYSTEM AND METHOD FOR THE VERIFICATION OF AUTHENTIC TELEPHONE NUMBERS IN A WIRELESS TELEPHONE SYSTEM

TECHNICAL FIELD

The present invention relates generally to cellular telephone operation, and, more particularly, to a system and method for the authentication of valid telephone numbers in a cellular telephone system.

BACKGROUND OF THE INVENTION

In a communications network, it is often desirable to identify and distinguish one transmitter from other transmitters operating within the network. For example, in the radio telephone industry, a cellular telephone system utilizes an electronic serial number (ESN) and a mobile telephone identification number (MIN) to provide a unique identification for each transmitter. When an individual subscriber or other authorized user of a particular cellular telephone wishes to place a phone call, he dials in a telephone number and presses the "Send" button. In response, his cellular telephone transmits its ESN and MIN to the cellular network so that the individual subscriber can be charged for the telephone call.

Unfortunately, unscrupulous individuals illegally operate cellular telephones by counterfeiting the ESN and MIN of a valid subscriber's telephone in order to obtain illegal access to the cellular network without paying for the service. The ESN and MIN of a cellular telephone can be obtained by a counterfeiter electronically monitoring the initial transmission of the user's telephone, and then programming the detected ESN and MIN into another telephone for illegal use. Thus, the mere transmission of the authentic ESN and MIN is by itself inadequate to protect a cellular telephone system from misuse by counterfeiters.

While the cellular telephone is identified by its ESN and MIN, it cannot be considered as an authorized cellular telephone because it is not known whether the ESN and MIN have been transmitted by the authorized cellular telephone or a fraudulent cellular telephone. For purposes of the present description, a cellular telephone identified on the basis of the transmitted ESN and MIN is designated as an unauthenticated cellular telephone until it is determined to be an authorized cellular telephone or a fraudulent cellular telephone. The designation of the unauthenticated cellular telephone as authorized or fraudulent must be made on the basis of some form of analysis beyond a simple check of the ESN and MIN to see that these are valid numbers.

In an effort to provide additional security, some cellular systems and other wireless services, authenticate cellular telephones based on the radio frequency (RF) transmission of data by the cellular telephones during a call set-up process. Rather than identify the cellular telephone by its ESN and MIN alone, the system identifies the cellular telephone by its transmission characteristics. In this manner, the cellular system operator can reject calls from fraudulent cellular telephones even when those cellular telephones transmit valid ESN and MIN numbers. For example, in U.S. Pat. No. 5,005,210 issued to Ferrell on Apr. 2, 1991 ("the Ferrell patent"), a system is described that analyzes certain transmitter characteristics in an effort to identify the transmitter type. The system in the Ferrell patent analyzes the manner in which the modulator makes a transition to the designated carrier frequency. This transient response is used to identify the type of transmitter.

While the Ferrell patent describes one class of transmission characteristics that can be used as a fingerprint, other transmission characteristics are also known in the art. For example, U.S. Pat. No. 5,420,910 issued to Rudokas et al. on May 30, 1995 ("the Rudokas patent"), describes an identifier, such as a radio frequency signature, that can be used to positively identify an authorized cellular telephone or a fraudulent cellular telephone. Other types of signature authentication systems are also known in the art and need not be described herein. These transmission characteristics, from whatever source they are derived, can be processed in different manners to create a "fingerprint" of the individual transmitter. The analogy with fingerprints is used herein because each transmitter transmission characteristics are believed to be completely unique. The transmitter fingerprint can be used to determine whether the transmission characteristics of the unauthenticated transmitter match the stored fingerprint of the authorized transmitter corresponding to the transmitted ESN and MIN. In such manner, the fingerprint is used with cellular telephone calls to authenticate a cellular telephone.

While the transmitter fingerprint is believed to be unique, it is not static. The transmission characteristics can change over time as the transmitter ages or is exposed to other extreme environmental conditions, such as dropping the cellular telephone. Under these circumstances, the stored fingerprint may no longer provide an accurate measure of the transmission characteristics. The stored fingerprint must be periodically revised to compensate for changes in the transmission characteristics.

Therefore, it can be appreciated that there is a significant need for a system and method to permit the alteration of a transmitter fingerprint in a manner that assures satisfactory security of the cellular telephone system. The present invention provides this and other advantages as will be illustrated by the following description and accompanying figures.

SUMMARY OF THE INVENTION

The present invention is embodied in a system and method for the authorization of telephone communication. The system includes a valid dialed digits storage area containing sets of valid telephone numbers indicative of a predetermined number of telephone numbers called by the customer. The system also includes a reference waveform storage area to store a plurality of response waveforms designated as reference waveforms for the customer's wireless telephone. A signature analyzer classifies an unauthenticated wireless telephone as authorized or fraudulent based on an analysis of the reference waveforms and a transmission characteristic of the unauthenticated wireless telephone in the present communication. A dialed digit storage area stores the telephone number dialed using the unauthenticated wireless telephone in the present communication. A decision engine compares the telephone number in the dialed digit storage area with the telephone numbers in the valid dialed digits storage area. The decision engine generates an authorization signal to process the present communication as valid if the signature analyzer classifies the unauthenticated wireless telephone as authorized based on the transmission characteristic or if the telephone number in the dialed digit storage area matches one of the telephone numbers in the valid dialed digits storage area. The decision engine generates a termination signal to terminate the present communication as invalid if the signature analyzer classifies the unauthenticated wireless telephone as fraudulent based on the transmission characteristic and if the telephone number in the dialed digit storage area does not match any of the telephone numbers in the valid dialed digit storage area.

The system can also include a modification processor to analyze the transmission characteristic for possible inclusion in the reference waveform storage area as one of the reference waveforms. The system will analyze the transmission characteristic for possible inclusion only if the telephone number in the dialed digits storage area matches a telephone number in one of two sets of valid telephone numbers in the valid dialed digits storage area. In one embodiment, the valid dialed digits storage area contains a first set of valid telephone numbers selected from customer bills that have been paid by the customer prior to the present communication. The valid dialed digit storage area also includes a second set of valid telephone numbers that are telephone numbers supplied by the customer prior to the present communication. The decision engine generates the authorization signal if the telephone number in the dialed digits storage area matches one of the telephone numbers in either the first or second sets of valid telephone numbers in the valid dialed digits storage area. However, the modification processor analyzes the transmission characteristic only if the telephone number in the dialed digits storage area matches one of the telephone numbers in the second set of valid dialed telephone numbers.

As noted above, one of the sets of valid telephone numbers may be customer-supplied telephone numbers and the decision engine generates the authorization signal regardless of the classification by the signature analyzer if the telephone number in the dialed digits storage area matches one of the telephone numbers supplied by the customer and stored in the valid dialed digits storage area. In this embodiment of the system, a modification processor analyzes the transmission characteristic for possible inclusion in the reference waveform storage area only if the telephone number in the dialed digits storage area matches one of the telephone numbers supplied by the customer and stored in the valid dialed digits storage area.

DETAILED DESCRIPTION OF THE INVENTION

For a more complete understanding of the present invention, the operation of a wireless telephone system will be briefly discussed. Although the discussion that follows is directed to cellular telephones, it should be clearly understood that the invention can be used with wireless telephone devices that transmit voice, such as cellular telephones, or data such as data modems. The term telephone as used herein is intended to include devices for wireless voice and data communication, including cellular telephone devices.

Figure 1:
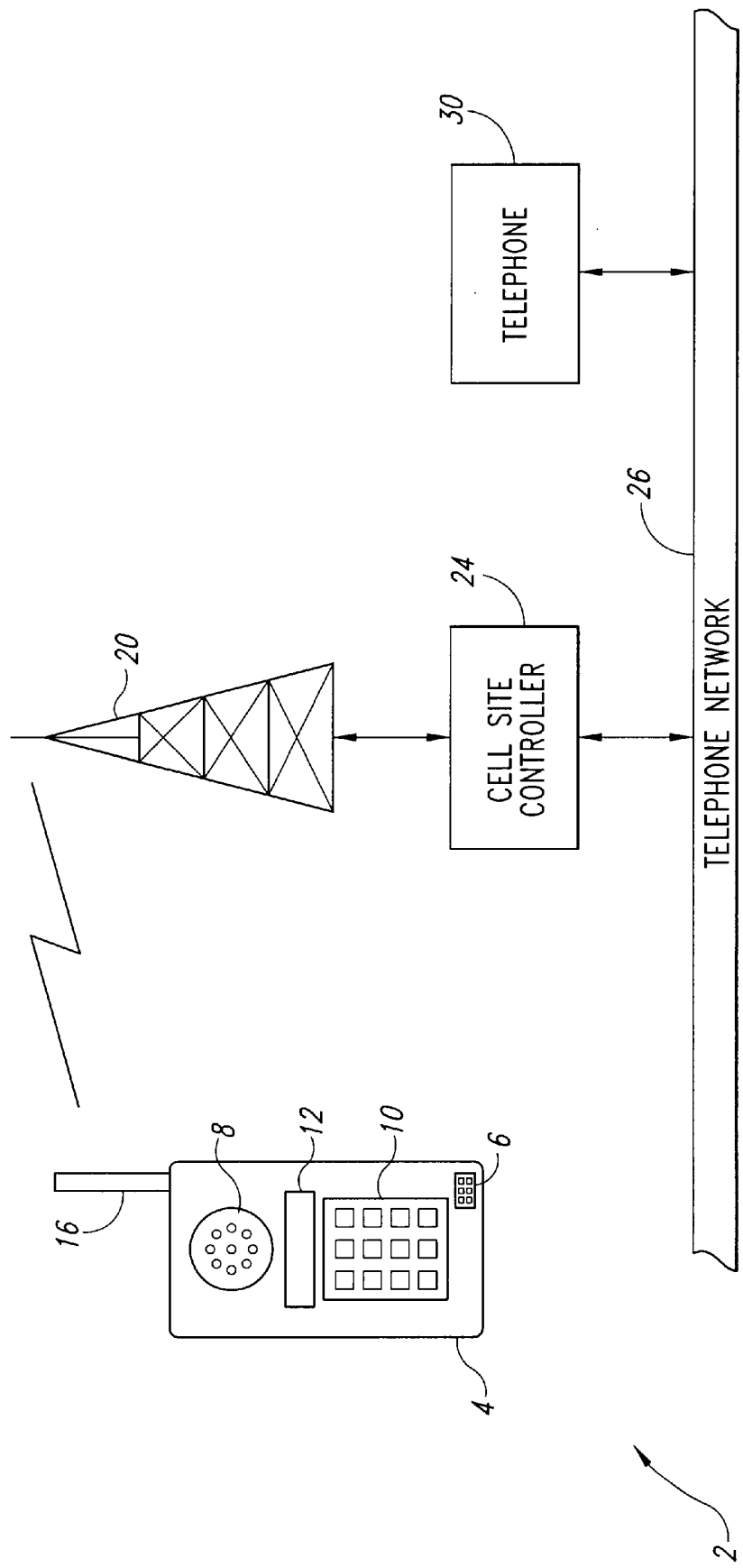
FIG. 1 illustrates the operation of a conventional cellular telephone system.

A conventional cellular telephone system is illustrated in the functional block diagram of FIG. 1. An individual cellular telephone 4 has a microphone 6 and a speaker 8, as well as a keypad 10 and a display 12. Transmitter and receiver circuits (see FIG. 2) within the cellular telephone 4 communicate via an antenna 16 to a cell site antenna 20 at a frequency typically in the 800 megahertz (MHz) frequency range. The signal received by the cell site antenna 20 is coupled to a cell site controller 24. The conventional cell site controller 24 verifies the authenticity of the ESN and MIN transmitted by the cellular telephone 4 at the beginning of a cellular telephone call, as well as the telephone number being called by the cellular telephone 4. The combination of digits of a telephone number to which a cellular telephone call is placed using the cellular telephone 4 are designated herein as "dialed digits."

The cell site controller 24 couples the cellular telephone 4 to a conventional telephone network 26. Also coupled to the telephone network 26 is a telephone 30 to which the cellular telephone 4 is placing a call. In this manner, the cellular telephone 4 can communicate with the telephone 30. Similarly, the telephone 30 may place a call to the cellular telephone 4 in the reverse manner described above. The telephone 30 is illustrated in FIG. 1 as connected directly to the telephone network 26. However, those skilled in the art will recognize that the telephone 30 could be another cellular telephone coupled to the cell site controller 24 by the cell site antenna 20, or another cell site controller and antenna (not shown).

Figure 2:
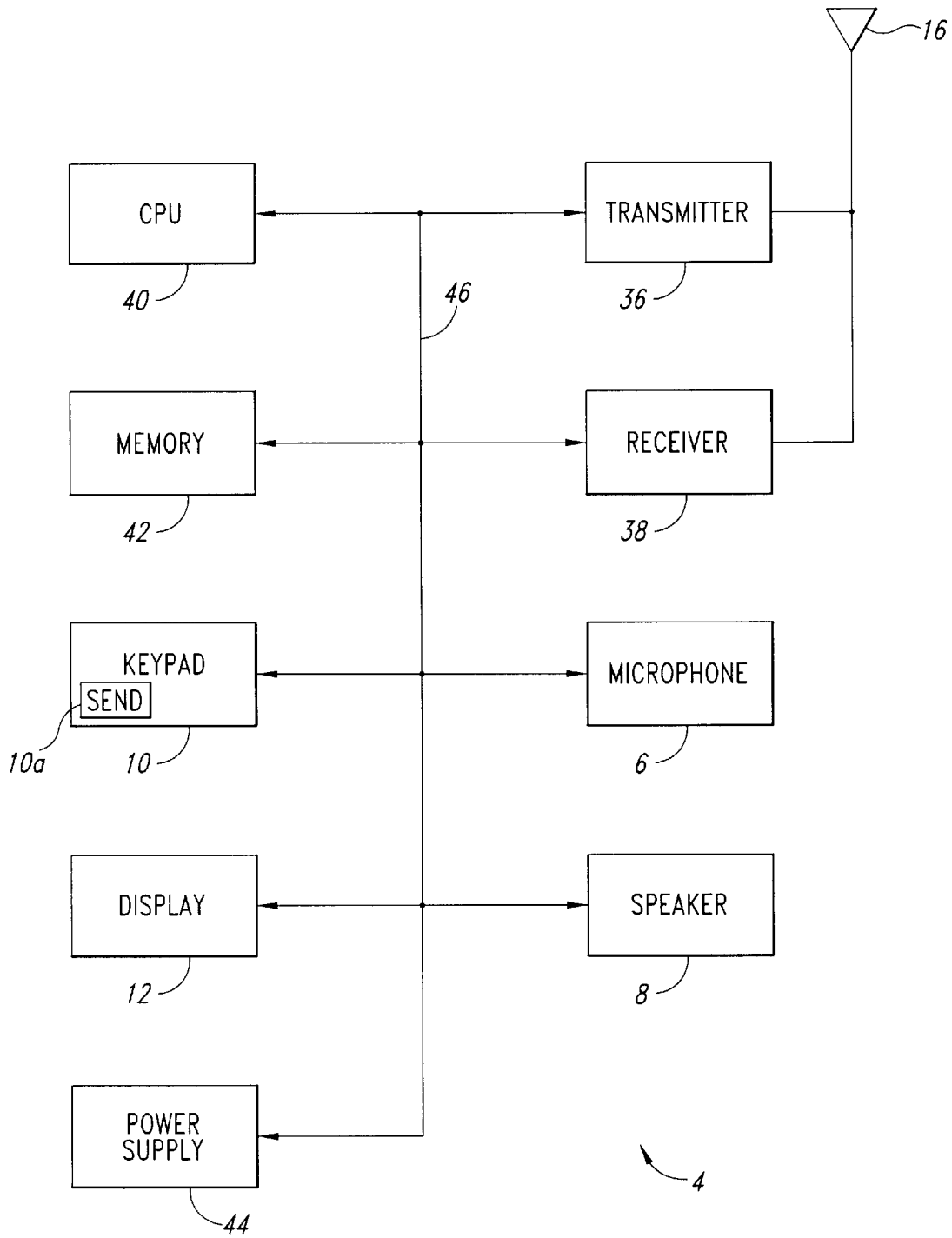
FIG. 2 is a functional block diagram of the conventional cellular telephone of FIG. 1.

The conventional cellular telephone 4 is illustrated in the functional block diagram of FIG. 2. The antenna 16 is coupled to a transmitter 36 and a receiver 38. The keypad 10 includes a send button 10a, to control the placement and receipt of cellular telephone calls. The microphone 6, speaker 8, and display 12 are conventional components that need not be described in any greater detail. The cellular telephone 4 also includes a central processing unit (CPU) 40, which may be an embedded controller, conventional microprocessor, or the like. In addition, the cellular telephone 4 includes a memory 42, which may include both random access memory (RAM) and read-only memory (ROM). The cellular telephone 4 also includes a power supply 44, which includes a battery (not shown) for internal power and a power supply connector (not shown). For the sake of brevity, other conventional components, such as the modulator, demodulator, and local oscillator have been omitted. The various components described above are coupled together by a bus 46. For the sake of clarity, the bus 46 is illustrated as coupling all components together. However, those skilled in the art will recognize that some components, such as the microphone 6 and speaker 8, are analog components while the CPU 40 and memory 42 are digital components. Thus, the bus 46 represents both the analog and digital interconnection of components. The operation of the cellular telephone 4 is well known in the art and thus will only be described in the context of the present invention.

The cellular telephone 4 communicates with the cell site controller 24 (see FIG. 1) using a control channel having a predetermined frequency for the cell site and a voice channel having a frequency designated by the cell site controller 24 for the particular call being placed. Initial communications between the cellular telephone 4 and the cell site controller 24 occur using only the control channel. The cellular telephone 4 transmits the stored ESN and MIN for the cellular telephone to the cell site controller 24 over the control channel. In addition, the dialed digits are also transmitted from the cellular telephone 4 to the cell site controller 24 over the control channel. Digital data using frequency-shift keying (FSK) of 10K baud Manchester-encoded data is transmitted and received over the control channel.

Figure 3:
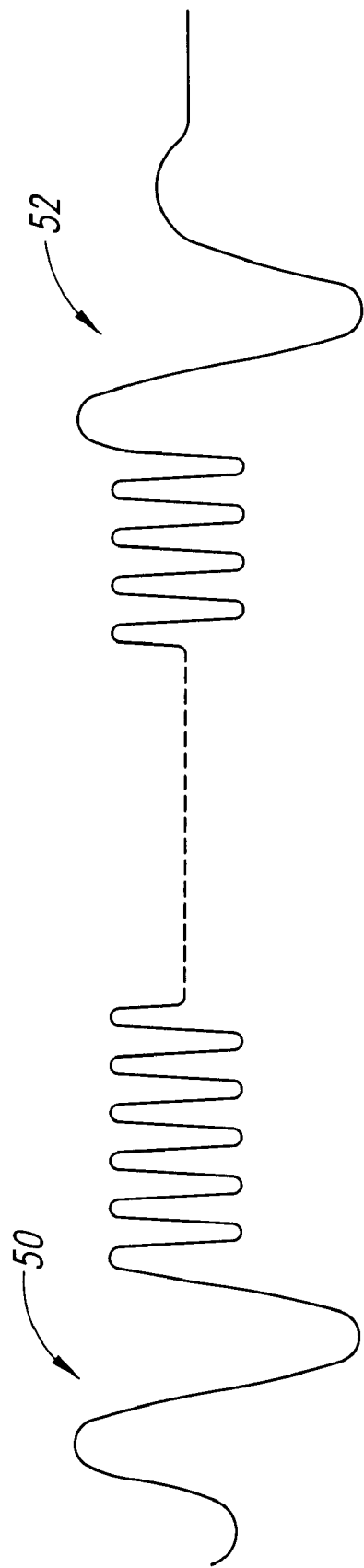
FIG. 3 is a waveform illustrating transmission characteristics of the transmitter of the cellular telephone of FIG. 2.

A typical waveform on the control channel is illustrated in FIG. 3. When the user first presses the "Send" button 10a (see FIG. 2) on the keypad 10, the transmitter 36 FSK modulates the data at a predetermined control frequency in the 800 MHz band. When the transmitter 36 is first activated, it must lock onto the appropriate radio frequency (RF) for the particular control channel. The process of locking onto the selected control channel frequency generates a turn-on transient 50. It should be noted that the waveform illustrated in FIG. 3 is not the RF signal itself, but rather an example of the demodulated output received at the cell site controller 24.

In addition to the turn-on transient 50, the cellular telephone 4 generates a turn-off transient 52. The turn-off transient 52 results from the turn-off transient response of the transmitter 36 (see FIG. 2) when transmission on the control channel is complete. The turn-on transient 50 and the turn-off transient 52, which are described in the Ferrell patent, are presented herein merely as examples of the transmission characteristics of an individual cellular telephone transmitter 36. Alternatively, the cell site controller 24 can analyze other transmission characteristics such as the transient response of the FSK data. Other reference waveforms are illustrated in the Rudokas patent and other references. These reference waveforms, which can be from any source of reference waveforms, are used to generate a fingerprint for the cellular telephone 4. The fingerprint is subsequently used to determine if the cellular telephone making a call is the authorized cellular telephone 4, or an illegal/pirate cellular telephone fraudulently transmitting an authentic ESN and MIN of the cellular telephone 4 of a valid subscriber.

The transmission characteristics, no matter how derived, are received at the cell site controller 24 and compared with a stored fingerprint for the authorized cellular telephone 4. For purposes of the present description, a present communication with an unauthenticated cellular telephone is analyzed and designated as a valid cellular telephone communication with an authorized cellular telephone or an invalid cellular telephone communication with a fraudulent cellular telephone. The process of comparing the transmission characteristic of the unauthenticated transmitter from the present call with the stored fingerprint should be performed in real-time to effectively deny or terminate invalid calls.

Unfortunately, no fingerprint analysis system is 100% effective. The transmission characteristic rarely, if ever, precisely matches the stored fingerprint. Furthermore, the transmission characteristics can change over time. Thus, it is of great importance that the stored fingerprint be periodically updated to accurately depict the current transmission characteristics of the authorized cellular telephone 4. The present invention is directed to a technique that permits the collection of updated transmission characteristics in a secure manner that assures the authenticity of the updated transmission characteristics to be used.

All signature analysis systems must have at least one reference waveform to compare with the transmission characteristic from an unauthenticated cellular telephone. In practice, a plurality of waveforms are used as reference waveforms. When gathering the reference waveforms, there must be a high degree of assurance that the reference waveforms are actually from the authorized cellular telephone 4 rather than waveforms from a fraudulent cellular telephone using the ESN and MIN of the authorized cellular telephone 4. If waveforms from a fraudulent cellular telephone are added to the stored reference waveforms, it tends to "pollute" the stored fingerprint, thus increasing the likelihood of misidentification. Misidentification can result in the misdesignation of valid calls from the authorized cellular telephone 4 as invalid calls from a fraudulent cellular telephone. Similarly, pollution of the stored reference waveforms may cause the misidentification of an invalid call from a fraudulent cellular telephone as a valid call from the authorized cellular telephone 4. Thus, great care must be taken to include only reference waveforms from the authorized cellular telephone 4. The present invention is directed to a system and method to ensure that only reference waveforms from the authorized cellular telephone 4 are included in the stored fingerprint.

Figure 4:
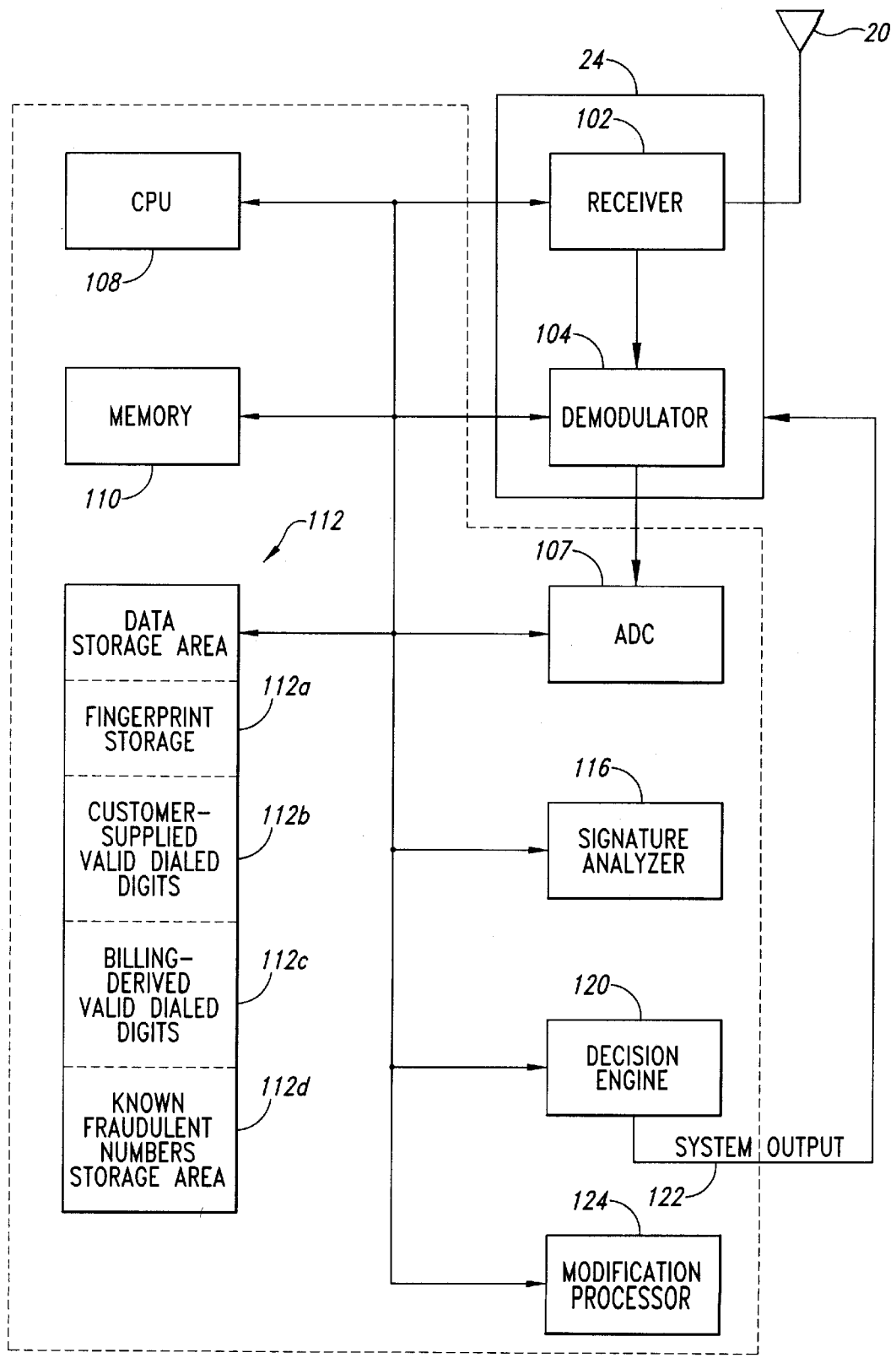
FIG. 4 is a functional block diagram of the system of the present invention.

The present invention is embodied in a system 100 illustrated in the functional block diagram of FIG. 4, and is typically installed at and communicates with the cell site controller 24. The system 100 includes a receiver 102 which is coupled to the antenna 20. The signals received by the receiver 102 are coupled to a demodulator 104 which demodulates the received RF signal and produces FSK data. An analog to digital converter (ADC) 107 digitizes the FSK data and other analog signals. A central processing unit (CPU) 108 processes the digitized data. Many of the processes described herein are performed by the CPU 108 using conventional programming techniques. The programming techniques are within the knowledge of those of ordinary skill in the art of computer programming and need not be described in detail herein.

The system 100 also includes a memory 110, which may include both random access memory (RAM) and read-only memory (ROM). A data storage area 112 is used to store data related to a plurality of calls from the authorized cellular telephone 4 and calls to the authorized cellular telephone. The data storage area 112 may be part of the memory 110, or a mass storage unit such as a hard disk drive, tape drive, or the like. The operation of the data storage area 112 will be described in detail below.

The system 100 also includes a signature analyzer 116 that performs a signature analysis of a transmission characteristic of the transmitter 36 (see FIG. 2) in the cellular telephone 4. One example of the signature analyzer 116 is described in U.S. patent application Ser. No. 08/611,429, entitled "Adaptive Waveform Matching For Use In Transmitter Identification," filed on Mar. 6, 1996, which is incorporated herein by reference in its entirety. That system performs a real-time analysis of the transmission characteristic from the unauthenticated transmitter and analysis of the stored fingerprint. The stored fingerprint comprises a plurality of individual reference waveforms and a composite mean waveform. The signature analyzer 116 provides an output indicative of the variance of the transmission characteristic from the composite mean waveform compared to the variance of the individual reference waveforms from the composite mean waveform. The signature analyzer 116 also provides a confidence value, which is a statistical measure of the degree of match between the transmission characteristic from the unauthenticated transmitter and the stored fingerprint. The above-referenced system also provides the ability to update the stored fingerprint and is thus adaptive. Additional operational details of the signature analyzer 116 are provided below. However, the scope of the present invention is not limited by the specific technique used to perform the analysis of the transmission characteristics. Rather, the present invention is directed to a technique for updating the stored reference waveforms in a secure manner.

The outputs of the signature analyzer 116 are provided as inputs to a decision engine 120. The decision engine 120 combines the data values and confidence values from the signature analyzer 116 to classify the present call as either valid or invalid. The classification is provided to the cell site controller 24 which uses this classification to determine whether or not to process the present call. If the present call is designated as a valid call, the cell site controller will process the call (i.e., permit the call to go through) whereas a call that is classified as invalid will not be processed by the cell site controller (i.e., the call will be terminated).

The decision engine 120 combines the various analysis portions of the system 100 to generate a system output 122. The system output 122 is a binary level output signal that is coupled to the cell site controller 24 to provide the cell site controller with a "YES/NO" decision for each call based on a combination of factors described below. The system 100 operates in real-time to analyze each call at the cell site controller 24.

The decision engine 120 generates a high logic level at the system output 122 if the decision engine determines that the present call is valid and should be processed by the cell site controller 24 (ie., a "YES" decision). The decision engine 120 generates a low logic level at the system output 122 if the decision engine 120 determines that the present call is invalid and should be terminated by the cell site controller 24 (i.e., a "NO" decision).

If the transmission characteristic from the cellular telephone 4 has been authenticated by the decision engine 120, a modification processor 124 analyzes the transmission characteristic to determine whether or not it should be added to the fingerprint in the data storage area 112 to be used for future identification purposes. The processing performed by the modification processor 124 will be described in detail below.

The various components of the system 100 are coupled together by a bus system 130, which may carry control signals and power in addition to data. Other components of the system 100 and cell site controller 24, such as a power supply, transmitter, telephone switching network, and the like are conventional components that form no part of the present invention. For the sake of brevity, those conventional components of the cell site controller 24 are omitted from the present description. It should be noted that many of the elements in FIG. 4, such as the signature analyzer 116, the decision engine 120, and the modification processor 124 may comprise a series of computer instructions executed by the CPU 108. However, for the sake of clarity, these functions are illustrated in FIG. 4 as separate blocks because each performs a distinct task.

The reference waveforms used by the system 100 are maintained in a fingerprint storage portion 112a of the data storage area 112. In addition, the data storage area 112 maintains a set of "valid dialed digits" for each authorized cellular telephone operating with the system 100. Valid dialed digits are defined herein as the telephone numbers of telephones called by the particular authorized cellular telephone 4. Each of the authorized cellular telephones would have its own set of valid dialed digits. Each set of valid dialed digits in the data storage area 112 are portioned into two separate lists. A customer-supplied valid dialed digits portion 112b in the data storage area 112 comprise a set of telephone numbers supplied by the customer. When the customer initially subscribes to the cellular telephone service, he supplies the cellular telephone service provider with a list containing a predetermined number of phone numbers that the subscriber expects to call using the cellular telephone. For example, the subscriber's home telephone and work telephone numbers may be supplied to the cellular telephone service provider by the customer. These customer-supplied numbers are stored in the customer-supplied valid dialed digits portion 112b. The customer may revise the list of customer-supplied valid dialed digits in writing to the cellular telephone service provider, or by calling the cellular telephone service provider. In either case, the cellular telephone service provider can obtain additional information from the customer to verify the customer's identity and thereby assure that the revised customer-supplied valid dialed digits are authentic.

A billing-derived valid dialed digits portion 112c in the data storage area 112 comprises telephone numbers selected from customer bills for the particular authorized cellular telephone. These "billing-derived valid dialed digits" are considered valid on the basis that the customer paid the bills without complaint and without the identification of any calls as fraudulent. For example, a predetermined number of billing-derived valid dialed digits may be selected from the most frequently called numbers from a past number of customer bills (e.g., the five most frequently called numbers from the last two bills). The billing-derived valid dialed digits will exclude any customer-supplied valid dialed digits provided by the customer. Thus, the data storage area 112 contains billing-derived valid dialed digits that are derived by the system 100 based on customer billings and stored in the billing-derived valid dialed digits portion 112c, and customer-supplied valid dialed digits that are supplied by the customer and stored in the customer-supplied valid dialed digits portion 112b. In addition, the data storage area 112 includes a known fraudulent numbers storage area 112d. The known fraudulent numbers storage area 112d contains a list of telephone numbers that have been previously identified as destination telephone numbers associated with fraudulent telephone calls. In one embodiment, the system 100 will not process any call to a destination telephone number corresponding to one of the numbers stored in the known fraudulent numbers storage area 112d.

In normal operation, the signature analyzer 116 compares the transmission characteristics from the unauthenticated cellular telephone with the stored fingerprint comprising the stored reference waveforms in the fingerprint storage portion 112a. For example, the signature analyzer 116 may compare the turn-on transient 50 (see FIG. 3) with the turn-on transient for the stored reference waveforms from the authorized cellular telephone 4. Other characteristics, such as the turn-off transient 52 may be independently analyzed by the signature analyzer 116 to derive data values and confidence values for each of a number of transmission characteristics. Based on the analysis of these transmission characteristics, the signature analyzer 116 will classify the present call as a valid call from the authorized cellular telephone 4, or an invalid call from a fraudulent cellular telephone.

The decision engine 120 accepts the data values and confidence values from the signature analyzer 116 and generates the system output 122 the cell site controller 24. The decision engine 120 would typically generate a low binary output, indicating a NO decision, at the system output 122 if the signature analyzer 116 determined that the present call is invalid based on a signature analysis of the transmission characteristics of the unauthenticated cellular telephone. However, the decision engine 120 will override the classification by the signature analyzer 116 and generate a high binary output, indicating a YES decision, at the system output 122, if the dialed digits from the unauthenticated cellular telephone in the present call matches one of the numbers in either the customer-supplied valid dialed digits portion 112b or the billing-derived valid dialed digits portion 112c. The match between the dialed digits from the unauthenticated cellular telephone and the valid dialed digits in the data storage area 112 indicates that the present call is valid. In this case, the decision engine 120 overrides the classified by the signature analyzer 116 as invalid. Thus, the system 100 provides a technique that can selectively override the signature analyzer 116, which is of great advantage in that the present call, which is likely valid, is processed without inconvenience to the customer even though the signature analyzer indicates it to be invalid. Without consideration of valid dialed digits, the present call would not have been processed and the customer would have been put to great inconvenience.

The customer-supplied valid dialed digits can also be used by the system 100 to assist in the initial collection of reference waveforms, and be used by a modification processor 124 to update the stored fingerprint. The fingerprint is initially computed by a number of steps that will now be described in detail. The system 100 first gathers a number of characteristic waveforms that have been identified as being from a particular authorized cellular telephone 4. These waveforms are designated as fingerprint or reference waveforms. The initial reference waveforms can be collected at the time the cellular telephone is programmed with the MN (generally at the time of sale) or can be collected by the system 100 using the customer-supplied valid dialed digits. The system 100 analyzes the transmission characteristics from the authorized cellular telephone 4 for possible inclusion as one of the stored reference waveforms. However, with the system 100, captured transmission characteristics will only be analyzed for possible inclusion in a stored reference waveform if the present communication was to a destination telephone number containing one of the customer-supplied valid dialed digits. Additional details of the operation of the system 100 to collect reference waveforms will be discussed below.

In the presently preferred embodiment, up to ten reference waveforms are collected to generate the fingerprint. Each of the reference waveforms is digitized by the ADC 107 to generate digitized waveforms. The CPU 108 normalizes each of the digitized reference waveforms with respect to itself. That is, a mean for each of the individual reference waveforms is calculated and subtracted from that individual reference waveform. This has the effect of eliminating any DC component in each reference waveform. The CPU 108 also aligns the ten normalized reference waveforms in time.

Figure 5A:
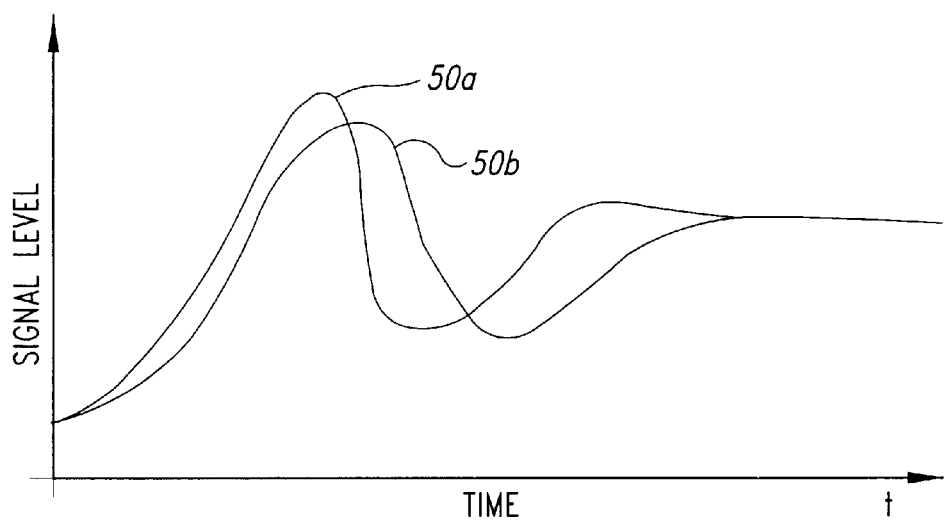
FIG. 5A depicts two waveforms analyzed by the system of FIG. 4.

As can be readily understood by those of ordinary skill in the art, the transmission characteristics, such as the turn-on transient 50 in the reference waveforms, can have a similar shape, but be slightly offset in time from one telephone call to the next. This effect is illustrated in FIG. 5A where two examples of the reference waveforms for the turn-on transient 50 (see FIG. 3), designated as 50a and 50b, are slightly offset in time. The reference waveforms 50a and 50b may be from two telephone calls in quick succession or spaced far apart in time, but both from the same authorized cellular telephone 4. The time offset of FIG. 5A merely illustrates the known principle that the transient response of the transmitter 36 (see FIG. 2) is almost never precisely identical from one telephone call to the next. The CPU 108 shifts the reference waveforms 50a and 50b of the reference waveforms with respect to one another to determine the best temporal alignment.

Figure 5B:
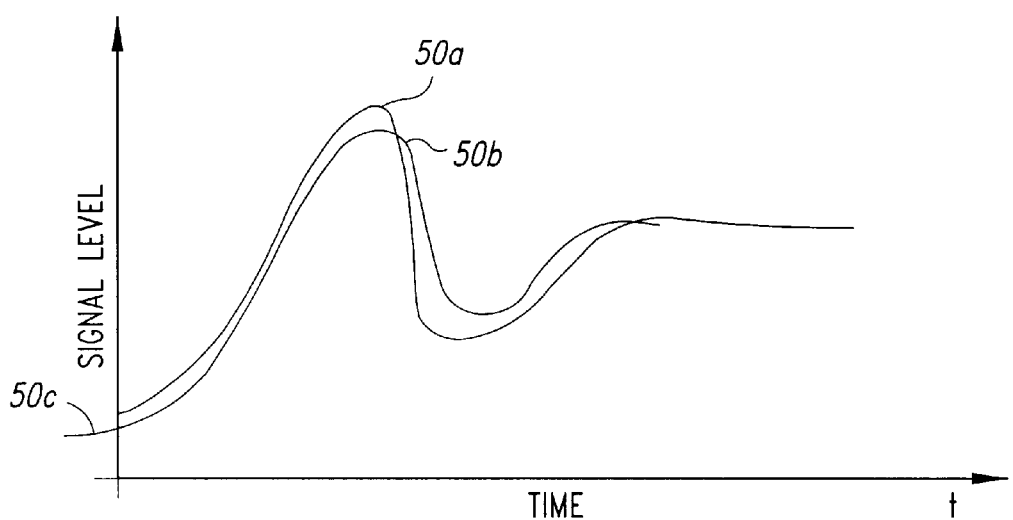
FIG. 5B illustrates the temporal alignment of the waveforms of FIG. 5A by the system of FIG. 4.

There are a number of known techniques for aligning the reference waveforms in time. In the presently preferred embodiment, the system 100 aligns two reference waveforms by shifting them with respect to one another and subtracting one reference waveform from the other until a minimum waveform is produced. In the example illustrated in FIG. 5A, the modification processor 124 shifts the reference waveform 50b to the left one bit at a time with respect to the reference waveform 50a and subtracts one reference waveform from the other to determine the best temporal alignment. FIG. 5B illustrates the reference waveforms 50a and 50b following temporal alignment. The modification processor 124 attempts to align the reference waveforms 50a and 50b so that the reference waveforms have good overall alignment. It should be noted that the user can designate a maximum temporal shift that would be allowed before declaring that the two reference waveforms cannot be aligned in time. This prevents the accidental alignment of unrelated portions of two reference waveforms.

The CPU 108 also determines where the reference waveforms overlap. The system 100 only analyzes overlapping portions of the reference waveforms. As illustrated in FIG. 5B, a portion 50c of the reference waveform 50b does not overlap the reference waveform 50a due to the temporal alignment process. Thus, the portion 50c will not be included in the fingerprint generation process by the system 100.

The CPU 108 further processes the normalized and aligned reference waveforms to generate a composite mean waveform, designated herein as M, which is the mean composite waveform of all the reference waveforms.

The composite mean waveform M can be generated by adding the values of each corresponding data point in each of the normalized reference waveforms and dividing this sum by the number N representing the number of reference waveforms used in the analysis. For example, if the corresponding data points in three reference waveforms were 10, 11, and 11, respectively, the mean value for that particular data point is 10.66 (i.e., (10+11+11)/3). The composite mean waveform M is normalized with respect to itself by calculating a mean value for the composite mean waveform M and subtracting the mean value from each data point in the composite mean waveform M.

In addition to generating the composite mean waveform M, the CPU 108 generates individual normalized waveforms for each of the reference waveforms by subtracting the mean value of the waveform from each data point in the waveform. Thus, the CPU 108 generates the composite mean waveform M and individual normalized waveforms for each of the reference waveforms. As discussed above, the system 100 only analyzes overlapping portions of the reference waveforms. Therefore, the composite mean waveform M and individual normalized reference waveforms are generated only for those overlapping portions of the reference waveforms.

The CPU 108 calculates the difference between each data point in the individual normalized reference waveforms and the corresponding data point in the composite mean waveform M. The CPU 108 raises each difference value to an exponential power, thus emphasizing differences between the individual normalized reference waveforms from the composite mean waveform M. The difference waveforms are designated herein as $\overline{F}_1$ to $\overline{F}_{10}$ for an example using ten reference waveforms $F_1$ to $F_{10}$. However, the system 100 can operate with more or fewer reference waveforms. In addition to emphasizing differences between the individual normalized reference waveforms and the composite mean waveform M, the application of an exponential power to each data point has the effect of de-emphasizing small differences between the individual normalized reference waveforms and the composite mean waveform M that may be caused by noise.

Each of the difference values in the difference waveforms $\overline{F}_1$ to $\overline{F}_{10}$ is raised to the exponential power, then summed by the CPU 108 to generate a variability value indicating the variability of each of the individual normalized reference waveforms from the composite mean waveform M. The system 100 determines whether the variability of the unauthenticated transmission characteristic is consistent with the variability of the fingerprint. The analysis performed by the system 100 can be expressed by the following equation:

$$V_j = \frac{\sum_{i=1}^{z}[\overline{F}i,j]^{1.2}}{Z} \quad (1)$$

where V is the data value indicative of the variability for the jth reference waveform, and $\overline{F}_{i,j}$ is the difference value for the ith data point in the jth reference waveform (i.e., the difference between the ith data point of the jth reference waveform and the ith data point in the composite mean waveform M), and Z is the number of data points in the portion of the waveform used in the analysis. In the presently preferred embodiment, the difference values $\overline{F}_{i,j}$ are raised to the power of 1.2. However, as will be discussed below, other weighting functions may also be used by the system 100. Thus, the system 100 does not merely compare the transmission characteristics of the unauthenticated cellular telephone with the composite mean waveform, but also considers the variability of reference waveforms from the cellular telephone 4 with the composite mean waveform.

The CPU 108 can perform conventional statistical analysis of the fingerprint data representing the reference waveforms. The CPU 108 sums up all the data values for each of the difference waveforms $\overline{F}_1$ to $\overline{F}_{10}$ raised to the exponential power and divides by Z, the number of data points in the portion of the waveform used in the analysis. The resultant variability values $V_1$ to $V_{10}$ provide an indication of the variability of each of the reference waveforms from the composite mean waveform M. The CPU computes the mean and standard deviation of the variability values $V_1$ to $V_{10}$.

Figure 6A:
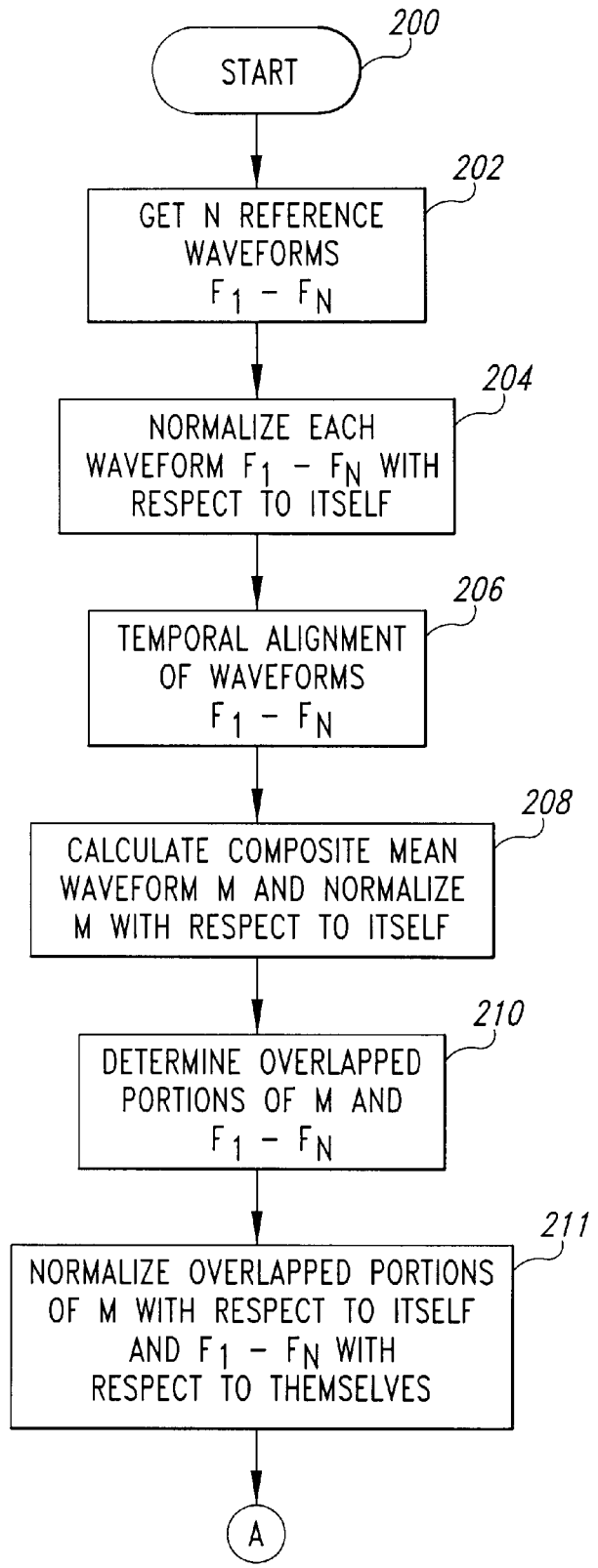
FIGS. 6A and 6B together are a flowchart of the operation of the system of FIG. 4 to generate a stored fingerprint.
Figure 6B:
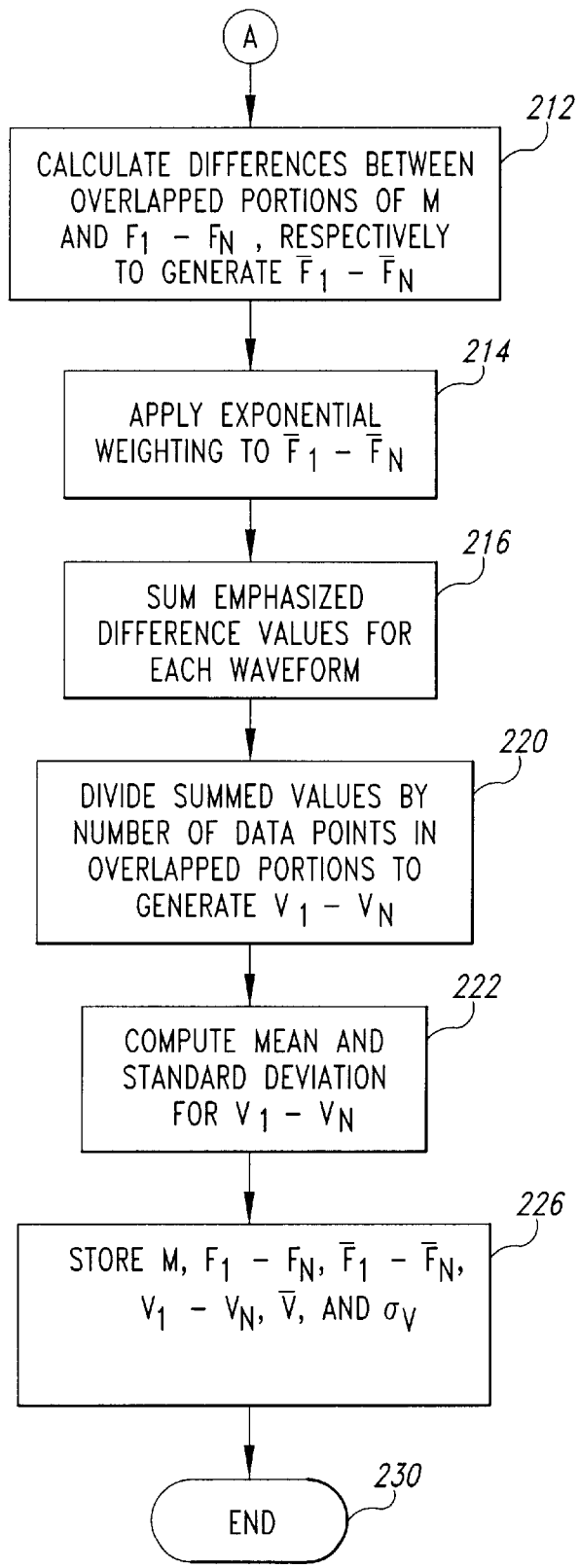

The operation of the system 100 to initially generate a stored fingerprint is illustrated in the flowcharts of FIGS. 6A and 6B. At the start 200, the system 100 has no reference waveforms stored for the authorized cellular telephone 4. In step 202, the system 100 obtains N reference waveforms $F_1$ to $F_N$ from the authorized cellular telephone 4. The N reference waveforms $F_1$ to $F_N$ can be obtained in the manner described above where N telephone calls are placed from the cellular telephone 4 to the predetermined number at the cell site controller 24 (see FIG. 1) at the time the cellular telephone is activated at the retail store or collected using the customer-supplied valid dialed digits. As discussed above, waveforms from the unauthenticated cellular telephone are captured by the system 100 and analyzed by the signature analyzer 116 (see FIG. 4) to determine whether the unauthenticated cellular telephone is the authorized cellular telephone 4 or a fraudulent cellular telephone. However, even if the unauthenticated cellular telephone is determined to be the authorized cellular telephone 4, the waveforms captured during the communication will not be analyzed for possible inclusion as a reference waveform unless the call from the authorized cellular telephone 4 is made to one of the customer-supplied valid dialed digits. In this way, the system 100 has a greater degree of assurance that the reference wave forms will not include any waveforms from a fraudulent cellular telephone.

In the presently preferred embodiment up to 10 reference waveforms are used. However, those skilled in the art will appreciate that more or fewer reference waveforms can be used. There is a danger that too few reference waveforms will not provide an adequate statistical basis for matching an unauthenticated transmission characteristic. In step 204, the CPU 108 (see FIG. 4) normalizes each of the reference waveforms $F_1$ to $F_N$ with respect to itself. As previously discussed, a mean is calculated for each individual waveform, and subtracted from the data points of its respective reference waveform $F_1$ to $F_N$.

In step 206, the CPU 108 performs a temporal alignment of the reference waveforms $F_1$ to $F_N$. As discussed above, the reference waveforms $F_1$ to $F_N$ can be aligned by shifting one with respect to another and subtracting one waveform from the other until a minimum value is found. Those skilled in the art can appreciate that other techniques can also be used to provide the desired temporal alignment of the reference waveforms $F_1$ to $F_N$. In the presently preferred embodiment, the CPU 108 will not shift any waveform more than 15% of the total waveform length. If the time shift exceeds this maximum value, the reference waveform will not be used to generate the fingerprint.

In step 208, the CPU 108 generates the composite mean waveform M and normalizes the composite mean waveform M with respect to itself. In step 210, the CPU 108 determines the overlapping portions of the composite mean waveform M and the reference waveforms $F_1$ to $F_N$. In step 211, the CPU 108 normalizes the overlapped portions of the composite waveform with respect to itself and also normalizes the overlapped portions of the reference waveforms $F_1$ to $F_N$ with respect to themselves. It should be noted that the mean value of the overlapped portion of the composite waveform M is not necessarily identical to the mean value of the overall composite waveform M. In step 211, the system 100 computes the mean value only for the overlapped portions of the composite mean waveform M. Similarly, the mean value of the overlapping portion of the reference waveforms $F_1$ to $F_N$ are not necessarily identical to the respective mean values of the overall reference waveforms $F_1$ to $F_N$.

In step 212, shown in FIG. 6B, the CPU 108 generates the difference waveforms $\overline{F}_1$ to $\overline{F}_{10}$ by subtracting the composite mean waveform M from each respective normalized aligned individual reference waveform. In step 214, the CPU 108 raises each difference value in the difference waveforms $\overline{F}_1$ to $\overline{F}_{10}$ to an exponential power. In the presently preferred embodiment, each difference value in the difference waveforms $\overline{F}_1$ to $\overline{F}_{10}$ is raised to the power of 1.2.

Figure 7:
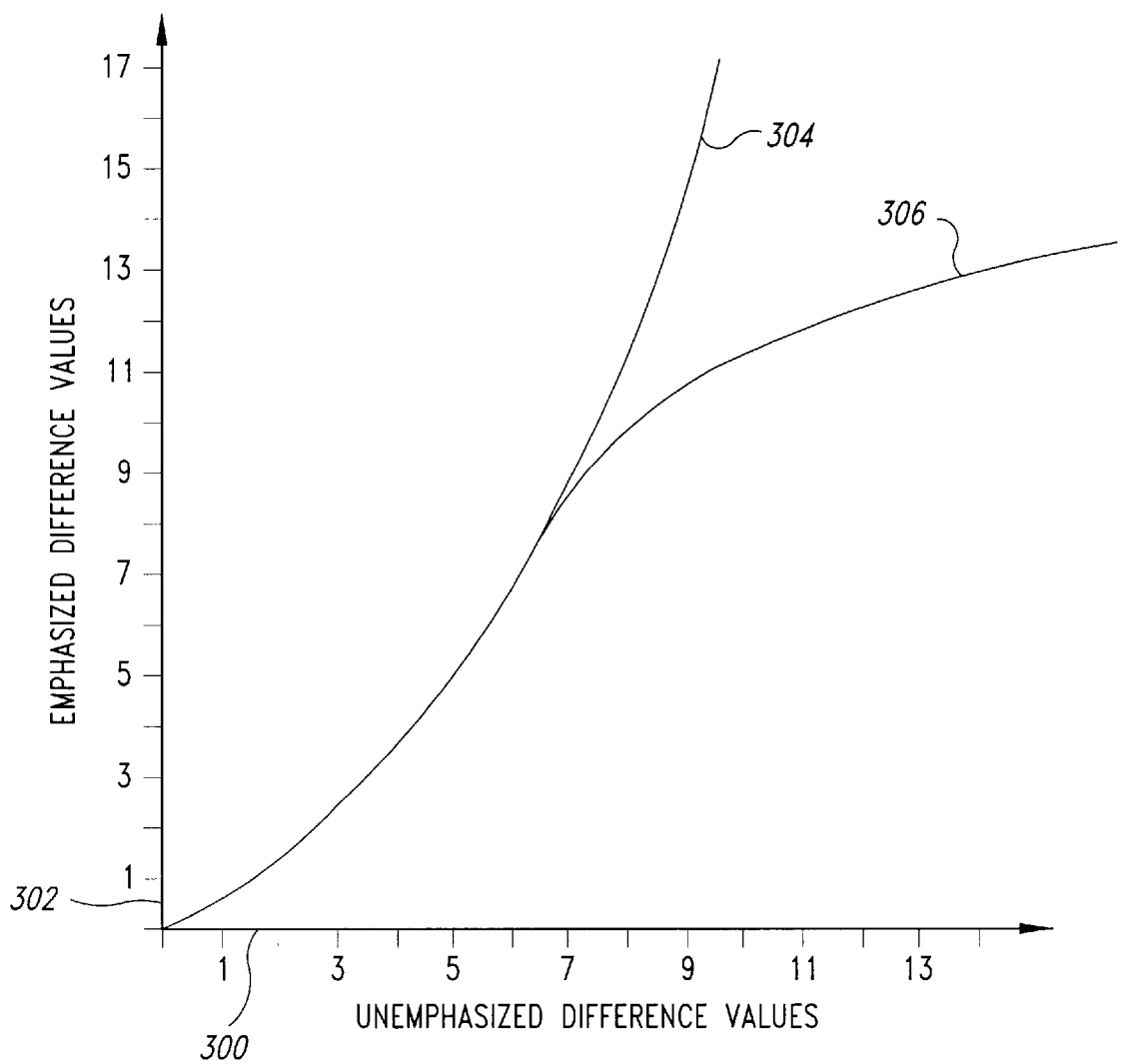
FIG. 7 illustrates weighting functions applied to waveforms by the system of FIG. 4.

This weighting function is illustrated graphically in FIG. 7 where a horizontal axis 300 represents the unemphasized difference values of the difference waveforms $\overline{F}_1$ to $\overline{F}_{10}$. The unemphasized difference values on the horizontal axis 300 are inputs to a look-up table (not shown). The corresponding emphasized difference values are shown on a vertical axis 302. A curve 304 illustrates the relationship between the unemphasized difference values on the horizontal axis 300 and the emphasized difference values on the vertical axis 302. The curve 304 graphically illustrates that when the difference between a data point in the individual normalized reference waveforms and the corresponding data point in the composite mean waveform M is small, the emphasized difference value will also be correspondingly small. However, as the difference between a data point in the individual normalized reference waveform and the corresponding data point in the composite mean waveform M grows larger, that difference is emphasized by the modification processor 124. Thus, applying the weighting function emphasizes differences between the individual difference waveforms $\overline{F}_1$ to $\overline{F}_{10}$ and the composite mean waveform M.

Alternatively, other weighting functions can be used by the system 100. For example, a curve 306 can be used to limit the maximum size of the difference values generated by the modification processor 124. Thus, as the values in the difference waveforms $\overline{F}_1$ to $\overline{F}_{10}$ grow sufficiently large, that difference will be de-emphasized. Application of the curve 306 limits the effect of a burst noise on the analysis by the system 100. Those of ordinary skill in the art will recognize that other curves could also be used to provide greater or lesser emphasis of differences between the individual normalized reference waveforms and the composite mean waveform M.

Returning again to FIG. 6B, in step 216 the CPU 108 sums up all of the emphasized difference values for each of the individual difference waveforms to. In step 220, the CPU 108 divides each of the summed values by Z, the number of data points in the overlapping portions of the waveforms, to generate the variability values $V_1$ to $V_N$. The variability values $V_1$ to $V_N$ provide the system 100 with an indication of the degree to which each of the individual normalized reference waveforms vary from the composite mean waveform M. In step 222, the CPU 108 computes a mean variability value $\overline{V}$ and a standard deviation $\sigma_V$ for the variability values $V_1$ to $V_N$. In step 226, the system 100 stores the reference waveforms $F_1$ to $F_N$, the individual difference waveforms $\overline{F}_1$ to $\overline{F}_N$, composite mean waveform M, the mean variability value $\overline{V}$, and the standard deviation $\sigma_V$ of the variability values in the data storage area 112 (see FIG. 4). The system 100 ends the process of analyzing reference waveforms in step 230. At this point, the system 100 has characterized N individual transmissions from the authorized cellular telephone 4, and determined the degree to which the individual transmission characteristics vary from the composite mean waveform M. It is this variability from the composite mean waveform that will be subsequently used to authenticate an unauthenticated cellular telephone by comparing the transmission characteristics of the unauthenticated cellular telephone with the stored fingerprint. The term "stored fingerprint" refers to all data derived from the authorized cellular telephone 4. This may include the individual reference waveforms $\overline{F}_1$ to $\overline{F}_N$, individual difference waveforms $\overline{F}_1$ to $\overline{F}_N$, the composite mean waveform M, the mean variability value $\overline{V}$, and the standard deviation $\sigma_V$ of the variability values. Any or all of these data may be used by the system to determine whether the unauthenticated cellular telephone is the authorized cellular telephone 4 or a fraudulent cellular telephone.

The initial generation of the fingerprint is concluded when the reference waveforms, composite mean waveform and statistical data (mean variability and standard deviation) are stored in the data storage area 112. The CPU 108 compares the transmission characteristics of the unauthenticated cellular telephone with the stored fingerprints. The comparison of the unauthenticated cellular telephone with the stored fingerprint includes many of the same steps described above. Specifically, the receiver 102 (see FIG. 4) receives the identification data (ESN and/or MIN) from the unauthenticated cellular telephone. In the process of the unauthenticated cellular telephone transmitting the identification data, the signal detected by the receiver 102 includes the transmission characteristics of the unauthenticated cellular telephone. As previously discussed, the transmission characteristics may be the turn-on transient 50 (see FIG. 3), the turn-off transient 52, or other transmission characteristic. Those skilled in the art can understand that the transmission characteristic from the unauthenticated cellular telephone must correspond to the characteristic stored as the fingerprint. For example, if the transmission characteristic is the turn-on transient 50, the stored fingerprint must also be based on the turn-on transient. Clearly, the system cannot store a fingerprint of the turn-off transient 52 and subsequently analyze the turn-on transient 50 and expect a match. Thus, the particular transmission characteristic from the unauthenticated cellular telephone must correspond to the transmission characteristics used in establishing the fingerprint. However, it is possible to independently analyze multiple transmission characteristics, such as an independent analysis of the turn-on transient 50 (see FIG. 3) and an independent analysis of the turn-off transient 52. The demodulator 104 demodulates the RF signal and provides the transmission characteristics to the ADC 107. The transmission characteristic is digitized by the ADC 107 and provided to the CPU 108.

The CPU 108 normalizes the transmission characteristic waveform from the unauthenticated cellular telephone with respect to itself, and performs a temporal alignment of the normalized, unauthenticated transmission characteristic with the composite mean waveform M stored in the data storage area 112. As previously discussed, the transmitted identification information is used to determine which fingerprint in the data storage area 112 will be used for comparison with the unauthenticated transmission characteristic. As previously noted, the user can designate a maximum temporal shift as allowed before declaring that the unauthenticated transmission characteristic cannot be aligned with the composite mean waveform M. The CPU 108 also determines where the unauthenticated transmission characteristic and the mean composite waveform M overlap.

The CPU 108 calculates the difference between each data point in the unauthenticated normalized waveform and the corresponding data point in the composite mean waveform M and scales difference value using the exponential or other weighting function as previously described.

The CPU 108 calculates a variability value for the unauthenticated transmission characteristic and compares the variability value for the unauthenticated transmission characteristic with the variability values of the reference waveforms $F_1$ to $F_{10}$ with respect to the composite mean waveform M. In this manner, the CPU 108 can determine whether the unauthenticated transmission characteristic has a greater or less degree of variability from the composite mean waveform M than do the reference waveforms $F_1$ to $F_{10}$.

The CPU 108 uses statistical measures of these variability values to determine whether the unauthenticated transmission characteristic is a suitable match to the stored fingerprint. The CPU 108 calculates a confidence value indicating the level of confidence that the unauthenticated transmission characteristic matches the corresponding stored fingerprint.

The CPU 108 uses a comparison formula having the following form:

$$CV = \frac{V_u - \overline{V}}{\sigma_v} \quad (2)$$

where CV is the confidence value, $V_u$ is the calculated variability of the unauthenticated transmission characteristic, $\overline{V}$ is the mean variability for the variability values $V_1$ to $V_{10}$ for the reference waveforms $F_1$ to $F_{10}$, and $\sigma_V$ is the standard deviation of the variability values $V_1$ to $V_{10}$.

As indicated by equation (2) above, if the confidence value CV equals 0, then the unauthenticated transmission characteristic is as different from the composite mean waveform M as is the average reference waveform. If the confidence value CV is less than 0, the unauthenticated transmission characteristic is closer to the composite mean waveform M than the average reference waveform. Conversely, if the confidence value CV is greater than 0, the variation of the unauthenticated transmission characteristic from the composite mean waveform M is greater than the variation of the average reference waveform. In operation, the user may select a predetermined value for the confidence value CV at which the unauthenticated transmission characteristic will be considered an unacceptable match with the stored fingerprint. It should be noted that this confidence value may be arbitrarily selected by the user to provide the desired degree of accuracy in matching the unauthenticated transmission characteristic with the stored fingerprint.

In normal operation, the mean variability $\overline{V}$ and standard deviation $\sigma_V$ are precomputed at the time the fingerprint is initially generated. Therefore, the system 100 need only compute the variability of the unauthenticated transmission characteristic $V_u$ and calculate the confidence value CV. Those computations can be done in real-time thus providing a valuable technique for the detection of unauthorized cellular telephones.

Figure 8:
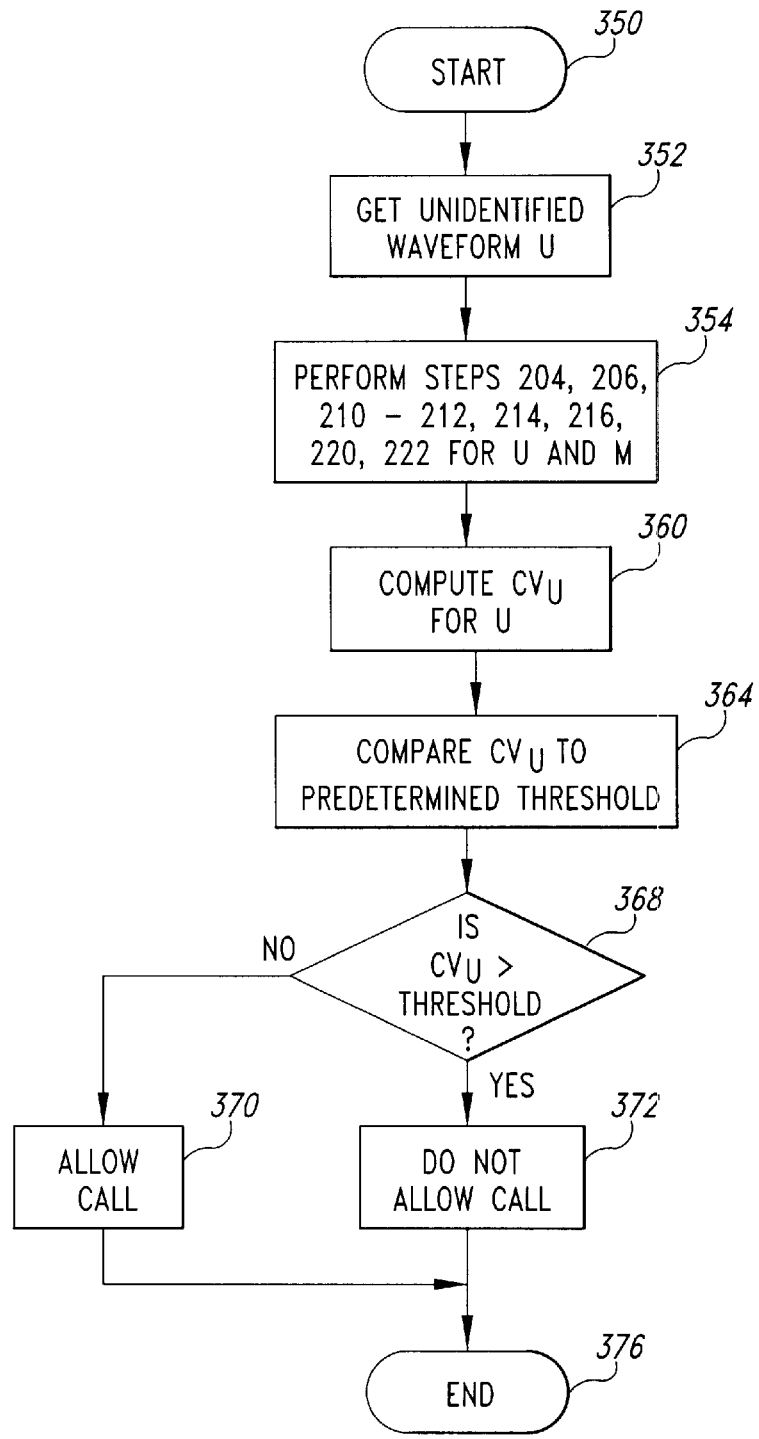
FIG. 8 is a flowchart of the signature analysis by the system of FIG. 4 to determine the validity of a cellular telephone call.

The comparison of the unauthenticated transmission characteristic with the stored fingerprint is illustrated in the flowchart of FIG. 8. At the start 350, the cell site controller 24 (see FIG. 1) has received the ESN and MIN for a particular cellular telephone. As previously discussed, the phone call may be from the authorized cellular telephone 4 or a fraudulent cellular telephone illegally transmitting the identification of the authorized cellular telephone. The system 100 will determine if the transmission characteristics of the unauthenticated cellular telephone match the stored fingerprint in the data storage area 112 (see FIG. 4) corresponding to the transmitted ESN/MIN for the authorized cellular telephone 4. At the start 350, the ADC 107 has converted the demodulated signal and converted the turn-on transient 50 (see FIG. 3) or other transmission characteristic to digital form. As discussed above, the system 100 can also analyze the turn-off transient 52 (see FIG. 3) or other transmission characteristics.

In step 352, the system 100 receives the unauthenticated transmission characteristic, designated herein as an unauthenticated waveform U from the ADC 107. As discussed above, the system 100 performs an analysis of the unauthenticated waveform U similar to that of the reference waveforms $F_1$ to $F_N$. For the sake of brevity, these steps are summarized in step 354, where the CPU 108 normalizes the unauthenticated waveform U with respect to itself, and performs a temporal alignment of the unidentified waveform U with the composite mean waveform M. The CPU 108 also determines overlapping portions of the unauthenticated waveform U with respect to the composite mean waveform M. The CPU 108 normalizes the overlapped portions of the composite mean waveform M with respect to itself and the overlapped portions of the unauthenticated waveform U with respect to itself. As previously discussed, the mean value for the overlapping portions of the composite mean waveform M are not necessarily identical to the mean value of the entire composite mean waveform M. Similarly, the mean value of the overlapped portions of the unauthenticated waveform U is not necessarily identical to the mean value for the entire waveform U.

The CPU 108 calculates differences between the overlapped portions of the unauthenticated waveform U and the composite mean waveform M to generate a difference waveform for the unauthenticated waveform U. The CPU 108 applies the weighting function to the data points of this difference waveform. It should be noted that the same weighting function must be applied to the difference waveform for the unauthenticated waveform U as was applied to the difference waveforms $\overline{F}_1$ to $\overline{F}_N$, such as raising the difference values to the same exponential power as were the difference values for the difference waveforms $\overline{F}_1$ to $\overline{F}_N$ (ie., 1.2 in the preferred embodiment). The CPU 108 also sums the emphasized difference values for the unauthenticated waveform U and divides by the number of data points to generate a variability value $V_U$ for the unauthenticated waveform U.

In step 360, the CPU 108 calculates the confidence value using equation (2) above to provide an indication of how closely the variability of the unauthenticated waveform U matches the variability $V_1$ to $V_N$ of the reference waveforms $F_1$ to $F_N$. In decision 368, the system 100 determines whether the computed confidence value CV exceeds a predetermined threshold. If the computed confidence value is less than the predetermined threshold, the result of decision 368 is NO. In that event, the system 100 classifies the present call from the unauthenticated cellular telephone as a valid call from the authorized cellular telephone 4 and permits the call to proceed in step 370. The system ends the analysis of the unauthenticated waveform U in step 376. If the computed confidence value exceeds the predetermined threshold, the result of decision 368 is YES. In that event, the system 100 classifies the present call from the unauthenticated cellular telephone as an invalid call from the fraudulent cellular telephone and, in step 372, will not allow the present call to proceed and be completed. Following step 372, the system 100 ends the analysis of the unauthenticated waveform U in step 376.

In addition, the system 100 can generate an audible and visual warning to the individual monitoring the cell site controller 24 (see FIG. 1) that a fraudulent cellular telephone is operating with the particular transmitted ESN and MIN. Thus, the system 100 determines the degree to which the variability of the unauthenticated waveform U matches the variability of reference waveforms $F_1$ to $F_N$ that are known or believed very likely to be from the authorized cellular telephone 4. As discussed above, a confidence value less than or equal to zero means that the unauthenticated waveform U varies from the composite mean waveform M with less than or the same degree of variability as the reference waveforms $F_1$ to $F_N$. In contrast, if the confidence value CV exceeds zero, this indicates that the variability of the unidentified waveform U exceeds the variability of the reference waveforms $F_1$ to $F_N$.

The function of the system 100 for the establishment of the initial fingerprint and the comparison of the unauthenticated waveform U to the fingerprint have now been described. The system 100 can accept a predetermined number N of reference waveforms, and "lock" the fingerprint so that it remains static and unchanging over time. However, as previously discussed, the transmission characteristics of the authorized cellular telephone 4 will change over time or due to environmental or other external factors, such as temperature. The system 100 is an adaptive waveform matching system in that it can accommodate such changes. The system 100 advantageously permits updating of reference waveforms by analyzing transmission characteristics captured during a communication between the authorized cellular telephone 4 and one of the customer-supplied valid dialed digits.

Figure 9:
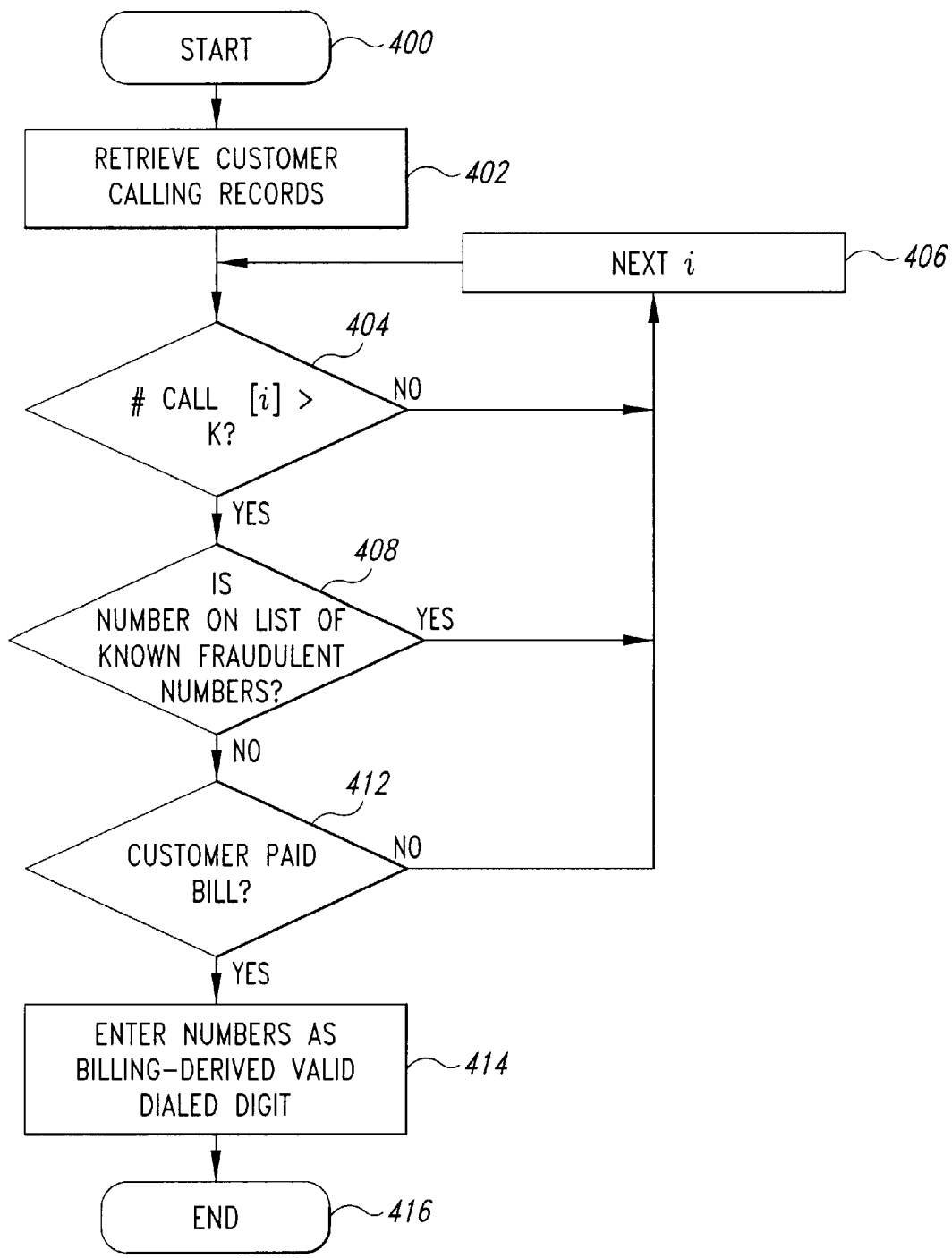
FIG. 9 is a flowchart of the operation of the system of FIG. 4 to generate data based on customer billing records.

As previously discussed, the classification by the signature analyzer 116 (see FIG. 4) can be overruled based on a match between the dialed digits and valid dialed digits in the data storage area 112. The present call is classified as a valid call, regardless of the classification by the signature analyzer 116, if the dialed digits are contained in the list of telephone numbers stored in the billing-derived valid dialed digits portion 112*c* or the customer-supplied valid dialed digits portion 112*b*. The operation of the system 100 to create the list of billing-derived valid dialed digits is illustrated in the flowchart of FIG. 9. At a start 400 it is assumed that the second portion of the list of valid dialed digits in the billing-derived valid dialed digits portion 112C contains no sets of valid dialed digits. In step 402, the system 100 retrieves the customer calling records for the previous period of time, such as the previous month. In decision 404 the system 100 analyzes each called telephone number i to determine whether the number of calls to that telephone number exceed a predetermined threshold K. In the presently preferred embodiment, K=5. This means that there must be at least six calls to a particular telephone number to be considered for possible inclusion into the billing-derived valid dialed digits portion 112*c* in the data storage area 112. If the number of calls for a particular telephone number i is not greater than the threshold, the result of decision 404 is NO. In that event, the system moves to the next number in step 406 and repeats the analysis for each telephone number contained within the customer calling records. If there were more than K calls to a particular number, the result of decision 404 is YES. In that event, in decision 408 the system 100 determines whether the particular telephone number is contained within the list of known fraudulent numbers in known fraudulent numbers storage area 112*d* of the data storage area 112.

If the particular telephone number is contained within the list of known fraudulent numbers, the result of decision 408 is YES and the system proceeds to the next telephone number in the customer calling records in step 406. If the particular telephone number is not contained in the list of known fraudulent numbers, the result of decision 408 is NO. In that event, the system 100, in step 412, determined whether the customer paid the bill for the call to the telephone number during the previous predetermined period of time. If the customer has not paid the bill, the resulting decision 412 is NO and the system moves to the next number in step 406. If the customer has paid the bill, the result of decision 412 is YES. In that event, in step 414 the system 100 enters that telephone number as a billing-derived valid dialed digit in the billing-derived valid dialed digits portion 112*c* within the data storage area 112. The system 100 ends the analysis at 416. Thus, the system provides a simple technique that is used to create the list of billing-derived valid dialed digits, which are used to prevent the misidentification of an authorized cellular telephone as fraudulent.

As discussed above, in the presently preferred embodiment, the system 100 will not analyze the transmission characteristics for possible inclusion in the fingerprint based on a match between the dialed digits from the unauthenticated cellular telephone and the list of billing-derived valid dialed digits.

Alternatively, the system 100 can analyze the transmission characteristics for possible inclusion in the fingerprint based on a match between the dialed digits from the unauthenticated cellular telephone and the list of billing-derived valid dialed digits under certain circumstances. For example, the system may require that the billing-derived valid dialed digits be present in multiple months, and with sufficient frequency in each month, to assure that the particular telephone number is valid. For example, the system 100 may analyze transmission characteristics for possible inclusion in the fingerprint if the valid dialed digit in the billing-derived valid dialed digit portion 112*c* appears for at least three consecutive months, and is called at least 10 times each month. This frequency and continuous pattern of calling to a particular number offers a greater degree of assurance that the transmission characteristics are from the authorized cellular telephone 4.

The system 100 will consider adding transmission characteristics from the unauthenticated cellular telephone to the stored fingerprint if the dialed digits match a customer-supplied valid dialed digit in the customer-supplied valid dialed digit portion 112*b* of the data storage area 112. It should be noted that the system 100 will also designate the present call as valid if the dialed digits match an entry in the list of customer-supplied valid dialed digits. This designation is made regardless of any analysis by the signature analyzer 116.

Figure 10:
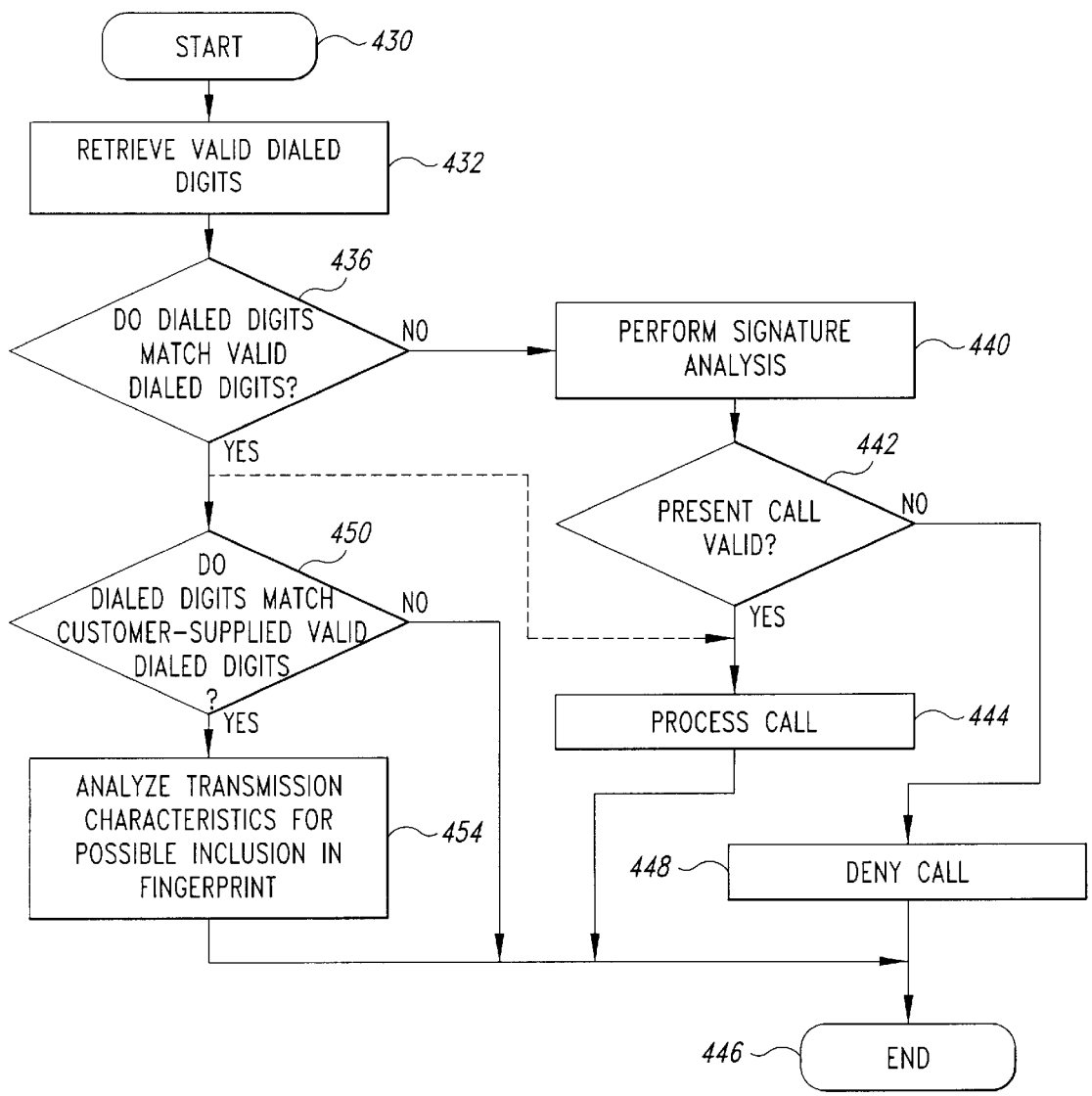
FIG. 10 is a flowchart of the operation of the system of FIG. 4 to determine the validity of a cellular telephone call.

The operation of the system 100 to classify the present call as valid or invalid based on dialed digits is illustrated in the flowchart of FIG. 10 where at a start 430, the cell site controller 24 (see FIG. 1) has received the transmitted ESN and MIN from an unauthenticated cellular telephone. In step 432, the system 100 retrieves the list of valid dialed digits corresponding to the transmitted ESN-MIN. In decision 436, the system 100 determines whether the dialed digits match any entry in the list of valid dialed digits. If there is no match between the dialed digits and the valid dialed digits, the result of decision 436 is NO. In that event, the system 100 will perform a signature analysis on the transmission characteristics in step 440. The operation of the signature analyzer 116 has been described above. When there is no match between the dialed digits and the valid dialed digits, the classification of the present call will be based on the signature analysis of the transmission characteristics. In decision 442, the system 100 determines whether the present call is valid based on the transmission characteristics and the signature analysis described above. If the present call is valid, the result of decision 442 is YES. and the system 100 processes the present call in step 444 and ends the analysis at 446.

If the present call is determined to be invalid on the basis of signature analysis, the result of decision 442 is NO. In that event, the system 100 denies the present call in step 448 and ends the analysis at step 446.

If the dialed digits match an entry in the valid dialed digits, the result of decision 436 is YES. In that event, the system 100 will determine whether the dialed digits match an entry in the customer-supplied valid dialed digits portion 112*b* or the billing-derived valid dialed digits portion 112*c*. It should be noted that if the result of decision 436 is YES, the system also generates a signal that allows the cell site controller 24 (see FIG. 1) to process the present call as a valid call in step 444 and end the call processing at step 446. However, the system 100 also performs the additional steps described below. The steps described below need not be performed in real-time because the present call has already been designated as valid and is processed independently by the cell site controller.

In decision 450, the system 100 determines whether the dialed digits match the customer-supplied valid dialed digits. If the dialed digits do not match a customer-supplied valid dialed digit, the result of decision 450 is NO. In that event, the system will not consider analyzing the transmission characteristic for possible inclusion in the stored fingerprint. Rather, the system ends the analysis process at step 446. If the dialed digits match a customer-supplied valid dialed digit, the result of decision 450 is YES. In that event, in step 454, the system will analyze the transmission characteristic for possible inclusion in the stored fingerprint and end the analysis at step 446. Various techniques for analyzing the transmission characteristic for possible inclusion in the stored fingerprint are described below.

The modification processor 124 (see FIG. 4) may simply determine if the transmission characteristic from the present call matches the stored reference waveforms $F_1$ to $F_N$ within a predetermined error limit. For example, the system could derive an average composite waveform of the stored reference waveforms and determine whether the transmission characteristic from the present call matches the average reference waveforms within a predetermined tolerance, such as a preset percentage, standard deviation, or the like.

Alternatively, the system 100 may include the transmission characteristic from the present call if its variance from the composite mean waveform M has a variability less than the variability of other individual reference waveforms within the data storage area 112. In a presently preferred embodiment, the system 100 applies this more stringent analysis to determine whether or not to include the waveforms from the present call in the stored fingerprint. This process is described in greater detail below.

In describing the analysis process, the waveforms captured during the present call are designated herein as a waveform I to show that it has now been identified as an authentic waveform. The identified waveform I is analyzed by the signature analyzer 116 (see FIG. 4) to determine if it is an acceptable match to the stored fingerprint. In addition to being considered an acceptable match to the stored fingerprint, the identified waveform I must have sufficiently good quality in terms of signal strength and variability and pass additional tests prior to being included as one of the stored reference waveforms in the stored fingerprint.

The cell site controller 24 calculates a received signal strength index (RSSI) value indicative of the strength of the received signal. This value may fluctuate over time due to environmental factors. For example, the user may be in a moving automobile, thus causing fluctuations in the RSSI. The system 100 will not permit the identified waveform I to be included in the stored fingerprint if the RSSI is below a minimum threshold value (i.e., the received signal is too weak) or if the RSSI variability is greater than a predetermined maximum value (i.e., the signal strength fluctuates too much). These tests assure that the identified waveform I is of sufficient quality to be analyzed for possible inclusion in the stored fingerprint.

In addition, the system 100 determines whether the identified waveform I is comparable in length to the reference waveforms $F_1$ to $F_N$ stored in the data storage area 112 (see FIG. 4). In addition, the system determines that the identified waveform I did not require excessive time shifting to be properly aligned with the composite mean waveform M in the fingerprint. If the identified waveform I is not of comparable length, or required excessive time shifting, the system 100 will not include the identified waveform I in the stored fingerprint even though it may have been an acceptable match for purposes of permitting the telephone call to be completed. Thus, the system requires a series of preliminary deterministic tests to assure that only high quality signals with a great degree of reliability are included in the stored fingerprint.

In addition to the preliminary tests described above, the system 100 applies a "sore-thumb" analysis to the identified waveform I and the stored fingerprint and discards any stored reference waveform that is considered unreliable based on its variability value. This analysis is called a "sore-thumb analysis" because it distinguishes any already stored reference waveform that "sticks out like a sore thumb" due to an unacceptably high variability value and eliminates that waveform from the fingerprint. In its adaptive mode, the system 100 analyzes not only the identified waveform I, but all stored reference waveforms $F_1$ to $F_N$, and their respective data values. The sore-thumb analysis is performed by constructing a temporary fingerprint using the reference waveforms $F_1$ to $F_N$ and computing the confidence value of identified waveform I with respect to the fingerprint for the reference waveforms $F_1$ to $F_N$. The system 100 then includes the identified waveform I and eliminates one of the other reference waveforms (e.g., $F_1$) and computes the confidence value for the reference waveform $F_1$ with respect to the fingerprint that now includes the reference waveforms $F_2$ to $F_N$ and I. The process is repeated so that confidence values are calculated for each of the reference waveforms, and the identified waveform I with respect to a fingerprint containing the remaining reference waveforms. The largest calculated confidence value is then compared to a maximum allowable confidence value for the number of waveforms in the fingerprint. If the maximum calculated confidence value exceeds the threshold for the number of waveforms in the fingerprint, that reference waveform with the maximum confidence value and its associated data is eliminated from the fingerprint.

Figure 11:
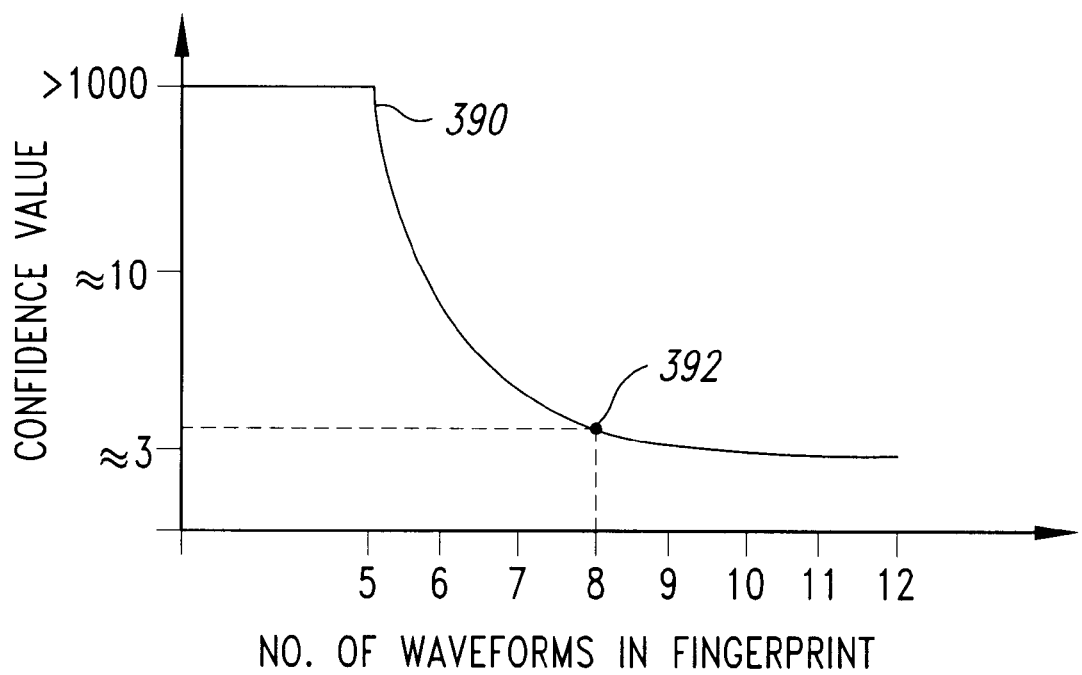
FIG. 11 is a waveform illustrating the confidence in analysis by the system of FIG. 4 based on the number of waveforms in the stored fingerprint.

For example, consider a fingerprint having seven reference waveforms $F_1$ to $F_7$, and the identified waveform I, for a total of eight waveforms in the fingerprint. For the sake of convenience, the identified waveform I is designated as $F_8$. The system 100 computes a fingerprint using the reference waveforms $F_1$ to $F_7$ and computes confidence value $V_1$ for the identified waveform $F_8$. The system repeats the process and determines a confidence value for $V_1$ with respect to the fingerprint comprising the reference waveforms $F_2$ to $F_8$. The confidence value for $V_2$ is computed with respect to the fingerprint comprising the reference waveforms $F_1$ and $F_3$ to $F_8$. The confidence value for $V_3$ is compared to the fingerprint including the reference waveforms $F_1$, $F_2$ and $F_4$ to $F_8$. This process continues and confidence values $CV_1$ to $CV_8$ are computed. The largest of the confidence values $CV_1$ to $CV_8$ is compared to a predetermined maximum value for the confidence value for eight reference waveforms in the fingerprint. An empirically derived curve 390 is illustrated in FIG. 11 showing the maximum value for confidence value as a function of the number of reference waveforms included in the fingerprint. In the example presented above with eight waveforms in the fingerprint, the maximum confidence value for any particular waveform is indicated by a point 392 on the curve 390, corresponding to a confidence value CV of approximately 3.5. If one of the computed confidence values $CV_1$ to $CV_8$ exceeds this maximum value, that particular reference waveform is eliminated from the fingerprint.

It should be noted that the sore-thumb analysis can eliminate any waveform that exceeds the maximum confidence value. This is not necessarily the identified waveform I, but can be any reference waveform already stored in the fingerprint storage portion 112a of the data storage area 112 (see FIG. 4). It should also be noted that, if the maximum computed confidence values $CV_1$ to $CV_8$ does not exceed the maximum value, all reference waveforms will be included in the fingerprint. Whenever the fingerprint is altered, such as by the inclusion of the identified waveform $F_8$ (ie., the identified waveform I), a new composite mean waveform M must be calculated and new fingerprint statistical values (ie., mean variability and standard deviation) must also be calculated. The new composite waveform and statistical data is stored in the fingerprint storage portion 112a of the data storage area 112.

Figure 12A:
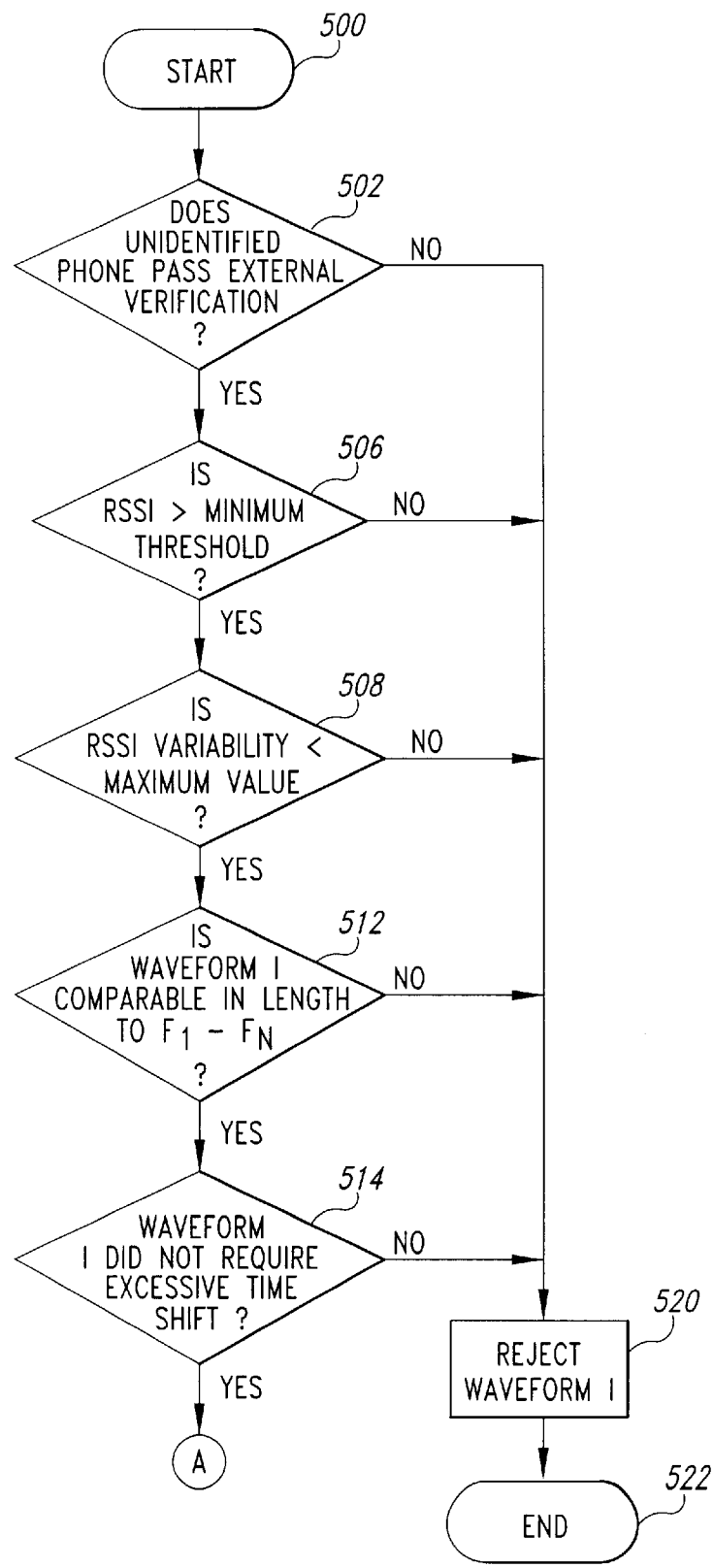
FIGS. 12A and 12B together are a flowchart of the analysis of an identified waveform for possible inclusion in the stored fingerprint.
Figure 12B:
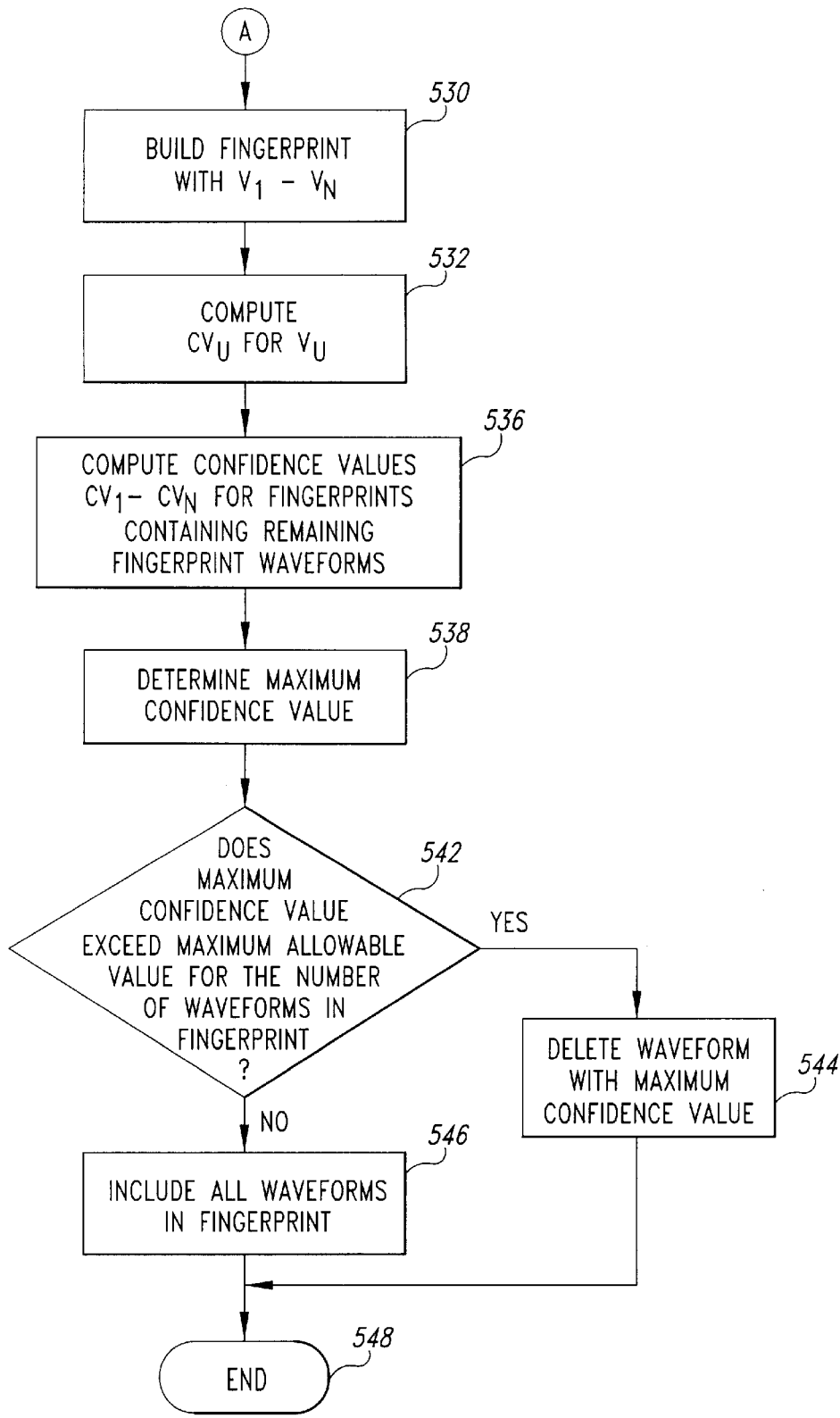

The flowcharts of FIGS. 12A and 12B illustrate the operation of the system 100 to determine whether a particular reference waveform should be included in the fingerprint. At the start 500, the identified waveform I has been identified as being a suitable match to the corresponding fingerprint. In decision 502, the system 100 determines whether the unauthenticated cellular telephone has passed the external verification criteria using the customer-supplied valid dialed digits in the customer-supplied valid dialed digits storage portion 112b of the data storage area 112. It should be noted that the external verification test of decision 502 could be performed outside of the process described in FIGS. 12A and 12B. For example, the external verification test can be used by the system 100 to authenticate the unauthenticated cellular telephone as described above with respect to FIG. 10 and, if the unauthenticated cellular telephone is authenticated in the manner described above, the external verification test can be used to trigger the sore-thumb analysis of FIGS. 12A and 12B. If the unauthenticated cellular telephone has passed the external verification criteria, the result of decision 502 is YES. In that event, the system determines whether the RSSI is greater than a minimum threshold in decision 506. If the RSSI is greater than the minimum threshold, the result of decision 506 is YES. In that event, the system, in decision 508, determines whether the variability of the RSSI was less than a predetermined maximum value. If the RSSI variability is less than the maximum value, the result of decision 508 is YES.

If the result of decision 508 is YES, in decision 512, the system 100 determines whether the identified waveform I is comparable in length to the stored reference waveforms $F_1$ to $F_N$. If the identified waveform I is comparable in length to the stored reference waveforms $F_1$ to $F_N$, the result of decision 512 is YES. In that event, in decision 514, the system 100 determines whether the identified waveform I required excessive time shifting. It should be noted that the system 100 can use a different maximum shifting value in the fingerprint inclusion analysis than was used in the waveform analysis of FIGS. 6A–6B. If the identified waveform I did not require excessive time shifting, the result of decision 514 is YES. In that event, the system proceeds to the sore-thumb analysis illustrated in the flowchart of FIG. 12B. If the result of any of the decisions 502, 506, 508, 512, or 514 were NO, the system rejects the identified waveform I in step 520 and ends the analysis in step 522. A rejection means the identified waveform I will not be included in the fingerprint even though it was considered a match for purposes of permitting the completion of the telephone call.

The sore-thumb analysis is illustrated in the flowchart of FIG. 12B where, in step 530, the system 100 constructs a fingerprint using the variability values $V_1$ to $V_{10}$ in the example of ten reference waveforms. In step 532, the system calculates a confidence value $CV_u$ for the variability $V_u$ of the identified waveform I. It should be noted that the fingerprint constructed in step 530 in the computation of the confidence value for the identified waveform I has previously been calculated for the initial waveform authentication analysis described above. However, these steps are included in this description for the sake of completeness.

In step 536, the system calculates confidence values $CV_1$ to $CV_{10}$ for fingerprints containing the remaining reference waveforms. As described above, the confidence values for each respective reference waveform includes the remaining reference waveforms and the identified waveform I. For example, the confidence value $CV_1$ is calculated using the reference waveforms $F_2$ to $F_{10}$ and the identified waveform I. The confidence value $CV_3$ is calculated against a fingerprint containing the reference waveforms $F_1$, $F_2$, $F_4$ to $F_{10}$, and I. The remaining confidence values are calculated in a similar manner. In step 538, the system 100 determines the maximum confidence value from the confidence values $CV_1$ to $CV_{10}$ and $CV_u$.

In decision 542, the system 100 determines whether that maximum confidence value determined in step 538 exceeds the maximum allowable confidence value for the given number of reference waveforms in the fingerprint. If the maximum confidence value does exceed the maximum allowable confidence value, the result of decision 542 is YES. In that event, the system deletes the waveform with the maximum confidence value in step 544. The system ends the analysis in step 548. If the maximum confidence value determined in step 538 does not exceed the maximum allowable confidence value for the given number of reference waveforms in the fingerprint, the result of decision 542 is NO. In that event, in step 546 the system includes all waveforms, including the identified waveform I, in the fingerprint. The system 100 ends the analysis in step 548.

It should be noted that the modification of the fingerprint need not be performed in real-time. Rather, the system 100 can perform the fingerprint modification analyses periodically or during periods of low call volume. This assures that the fingerprint in the data storage area 112 (see FIG. 4) adapts to changes in the transmission characteristics of the authorized cellular telephone 4.

Thus, the system 100 provides an adaptive waveform matching procedure that determines whether the transmission characteristics of an unidentified cellular telephone are sufficiently close to a stored fingerprint corresponding to the identification number (i.e., ESN or MIN or both) of the unidentified cellular telephone and also determines whether to add the current transmission characteristic waveform to the fingerprint. The system 100 can adapt to both short-term and long-term changes in the transmission characteristics and permit the user to select a maximum variability that will be allowed before rejecting a particular transmitter as being an unsuitable match to the stored fingerprint. The system is automated and can provide real-time analysis of a large number of cellular telephone calls within a short period of time.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for the authorization of a telephone communication with a customer wireless telephone in a wireless telephone system, the authorization system comprising:

a valid dialed digits storage area containing a plurality of preselected valid destination telephone numbers for the customer;

a reference waveform storage area to store a plurality of response waveforms designated as reference waveforms for the customer wireless telephone;

a signature analyzer to classify an unauthenticated wireless telephone as authorized or fraudulent based on an analysis of the reference waveforms and a transmission characteristic of the unauthenticated wireless telephone in a present telephone communication with the unauthenticated wireless telephone;

a dialed digit storage area to store a destination telephone number dialed on the unauthenticated wireless telephone in the present communication; and a decision engine to generate an authorization signal to process the present communication as valid or to generate a termination signal to terminate the present communication as invalid, the decision engine comparing the dialed telephone number in the dialed digit storage area with the plurality of preselected valid destination telephone numbers in the valid dialed digits storage area, the decision engine generating the authorization signal and to permit completion of the present communication to the dialed telephone number if the signature analyzer classifies the unauthenticated wireless telephone as authorized based on the transmission characteristic or if the dialed telephone number in the dialed digit storage area matches one of the preselected valid destination telephone numbers in the valid dialed digits storage area regardless of the classification by the signature analyzer, the decision engine generating the termination signal if the signature analyzer classifies the unauthenticated wireless telephone as fraudulent based on the transmission characteristic and if the dialed telephone number in the dialed digit storage area does not match one of the preselected valid destination telephone numbers in the valid dialed digits storage area.

2. The system of claim 1, further including a modification processor to analyze the transmission characteristic of the unauthenticated wireless telephone for inclusion in the reference waveform storage area as one of the reference waveforms only if the dialed telephone number in the dialed digits storage area matches one of the valid destination telephone numbers in the valid dialed digits storage area.

3. The system of claim 2 for use in conjunction with customer-paid telephone bills wherein the valid destination telephone numbers in the valid dialed digits storage area comprise a first set of valid destination telephone numbers selected from customer bills that have been paid by the customer prior to the present communication and a second set of valid destination telephone numbers that are customer-supplied telephone numbers provided by the customer prior to the present communication, the decision engine generating the authorization signal and causing completion of the present communications to the dialed telephone number if the dialed telephone number in the dialed digits storage area matches one of the valid destination telephone numbers in either the first or second sets of valid destination telephone numbers in the valid dialed digits storage area, and the modification processor analyzing the transmission characteristic of the unauthenticated wireless telephone only if the dialed telephone number in the dialed digits storage area matches one of the valid destination telephone numbers in the second set of valid destination telephone numbers in the valid dialed digits storage area.

4. The system of claim 1 wherein the valid destination telephone numbers in the valid dialed digits storage area include customer-supplied telephone numbers provided by the customer prior to the present communication.

5. The system of claim 4 wherein the decision engine generates the authorization signal regardless of the classification of the unauthenticated wireless telephone by the signature analyzer if the dialed telephone number in the dialed digits storage area matches one of the customer-supplied telephone numbers stored in the valid dialed digits storage area.

6. The system of claim 4, further including a modification processor to analyze the transmission characteristic of the unauthenticated wireless telephone for inclusion in the reference waveform storage area as one of the reference waveforms only if the dialed telephone number in the dialed digits storage area matches one of the customer-supplied valid telephone numbers in the valid dialed digits storage area.

7. The system of claim 1 for use in conjunction with customer-paid telephone bills wherein the valid destination telephone numbers in the valid dialed digits storage area include telephone numbers selected from customer bills that have been paid by the customer prior to the present communication.

8. The system of claim 7 wherein the decision engine generates the authorization signal regardless of the classification of the unauthenticated wireless telephone by the signature analyzer if the dialed telephone number in the dialed digits storage area matches one of the valid destination telephone numbers from customer bills stored in the valid dialed digits storage area.

9. A system for the authorization of a telephone communication with a customer wireless telephone in a wireless telephone system, the authorization system comprising:

a reference waveform storage area to store a plurality of response waveforms designated as reference waveforms for the customer wireless telephone;

a signature analyzer to classify an unauthenticated wireless telephone as authorized or fraudulent based on a transmission characteristic of the unauthenticated wireless telephone in a present telephone communication with the unauthenticated wireless telephone;

a first storage area to store valid telephone numbers supplied by the customer prior to the present telephone communication;

a second storage area to store valid telephone numbers derived from customer paid bills prior to the present telephone communication;

a dialed digit storage area to store a telephone number dialed on the unauthenticated wireless telephone in the present communication; and a decision engine to generate an authorization signal to indicate authorization to process the present telephone communication as valid or to generate a termination signal to terminate the present telephone communication as invalid, the decision engine comparing the telephone number in the dialed digit storage area with the telephone numbers in the first and second storage areas, the decision engine generating the authorization signal to permit completion of the present communication to the dialed telephone number if the signature analyzer classifies the unauthenticated wireless telephone as authorized based on the transmission characteristic or if the telephone number in the dialed digit storage area matches one of the telephone numbers in either the first or second storage areas.

10. The system of claim 9 wherein the decision engine generates the termination signal if the signature analyzer classifies the unauthenticated wireless telephone as fraudulent based on the transmission characteristic and if the telephone number in the dialed digit storage area does not match any of the telephone numbers in the first and second storage areas.

11. The system of claim 9, further including a modification processor to analyze the transmission characteristic of the unauthenticated wireless telephone for inclusion in the reference waveform storage area as one of the reference waveforms only if the telephone number in the dialed digits storage area matches one of the telephone numbers in the first storage area.

12. A method for the authorization of a telephone communication with a customer wireless telephone in a wireless telephone system, the method comprising the steps of:
storing preselected valid telephone numbers indicative of a predetermined number of telephone numbers for the customer;
storing a plurality of response waveforms designated as reference waveforms for the customer wireless telephone;
analyzing a transmission characteristic of an unauthenticated wireless telephone to classify the unauthenticated wireless telephone as authorized or fraudulent in a present telephone communication with the unauthenticated wireless telephone based on a comparison of the transmission characteristic of the unauthenticated wireless telephone with the stored reference waveforms;
comparing a telephone number dialed on the unauthenticated wireless telephone in the present telephone communication with the stored preselected valid telephone numbers; and
generating an authorization signal to process the present telephone communication as valid and to permit the completion of the present communication to the dialed telephone number if the step of analyzing the transmission characteristic classifies the unauthenticated wireless telephone as authorized or if the telephone number dialed on the unauthenticated wireless telephone in the present telephone communication matches one of the stored preselected valid telephone numbers.

13. The method of claim 12, further including the step of generating a termination signal to terminate the present telephone communication as invalid if the signature analyzer classifies the unauthenticated wireless telephone as fraudulent based on the transmission characteristic telephone and if the telephone number dialed on the unauthenticated wireless telephone in the present telephone communication does not match any of the stored preselected valid telephone numbers.

14. The method of claim 12, further including the step of further analyzing the transmission characteristic of the unauthenticated wireless telephone for inclusion as one of the reference waveforms only if the telephone number dialed on the unauthenticated wireless telephone in the present telephone communication matches one of the stored preselected valid telephone numbers.

15. The method of claim 14 for use in conjunction with customer-paid bills wherein the preselected valid telephone numbers comprise a first set of stored valid telephone numbers selected from customer bills that have been paid by the customer prior to the present telephone communication and a second set of stored valid telephone numbers that are customer-supplied telephone numbers provided by the customer prior to the present telephone communication, the authorization signal being generated by the step of generating if the telephone number dialed on the unauthenticated wireless telephone in the present telephone communication matches one of the telephone numbers in either the first or second sets of stored preselected valid telephone numbers, the step of further analyzing being performed only if the telephone number dialed on the unauthenticated wireless telephone in the present telephone communication matches one of the second set of stored preselected valid telephone numbers.

16. The method of claim 12 wherein the stored preselected valid telephone numbers are customer-supplied telephone numbers provided by the customer prior to the present telephone communication.

17. The method of claim 16, further including the step of further analyzing the transmission characteristic for the unauthenticated wireless telephone for inclusion as one of the reference waveforms only if the telephone number dialed on the unauthenticated wireless telephone in the present telephone communication matches one of the stored preselected valid telephone numbers.

18. A method for the authorization of a telephone communication with a customer wireless telephone in a wireless telephone system, the method comprising the steps of:
storing a plurality of response waveforms designated as reference waveforms for the customer wireless telephone;
analyzing a transmission characteristic of an unauthenticated wireless telephone to classify the unauthenticated wireless telephone as authorized or fraudulent in a present telephone communication with the unauthenticated wireless telephone based on a comparison of the transmission characteristic of the unauthenticated wireless telephone with the stored reference waveforms;
storing a first set of valid telephone numbers supplied by the customer prior to the present telephone communication;
storing a second set of valid telephone numbers derived from customer paid bills prior to the present telephone communication;
comparing a telephone number dialed on the unauthenticated wireless telephone in the present telephone communication with the first and second sets of stored valid telephone numbers; and
generating an authorization signal to indicate authorization to process the present telephone communication as valid and to permit completion of the present communication to the dialed telephone number if the step of analyzing the transmission characteristic classifies the unauthenticated wireless telephone as authorized or if the telephone number dialed on the unauthenticated wireless telephone in the present telephone communication matches one of the telephone numbers in the first and second sets of stored valid telephone numbers.

19. The method of claim 18, further including the step of generating a termination signal to terminate the present telephone communication as invalid if the step of analyzing classifies the unauthenticated wireless telephone as fraudulent based on the transmission characteristic of the unauthenticated wireless telephone and the telephone number dialed on the unauthenticated wireless telephone in the present telephone communication does not match any of the telephone numbers in the first and second sets of valid stored valid telephone numbers.

20. The method of claim 18, further including the step of further analyzing the transmission characteristic of the unauthenticated wireless telephone for inclusion as one of the stored reference waveforms only if the telephone number dialed on the unauthenticated wireless telephone in the present telephone communication matches one of the telephone numbers in the first set of valid telephone numbers.

* * * * *